United States Patent
Moniruzzaman et al.

(10) Patent No.: US 10,030,140 B2
(45) Date of Patent: Jul. 24, 2018

(54) FIBER REINFORCED POLYARYLETHERKETONE RESIN COMPOSITIONS

(71) Applicant: SABIC Global Technologies B.V., Bergen op Zoom (NL)

(72) Inventors: Mohammad Moniruzzaman, Exton, PA (US); Kapil Sheth, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 1010 days.

(21) Appl. No.: 14/034,125

(22) Filed: Sep. 23, 2013

(65) Prior Publication Data

US 2015/0087767 A1    Mar. 26, 2015

(51) Int. Cl.
| | |
|---|---|
| *C08L 79/08* | (2006.01) |
| *C08G 73/10* | (2006.01) |
| *C08G 4/00* | (2006.01) |
| *C08L 65/04* | (2006.01) |
| *C08K 3/04* | (2006.01) |
| *C08K 7/14* | (2006.01) |
| *C08L 71/00* | (2006.01) |
| *C08G 61/12* | (2006.01) |
| *C08L 65/00* | (2006.01) |
| *C08K 7/06* | (2006.01) |

(52) U.S. Cl.
CPC ............ *C08L 71/00* (2013.01); *C08G 61/127* (2013.01); *C08G 73/1053* (2013.01); *C08G 73/1064* (2013.01); *C08G 73/1071* (2013.01); *C08K 3/04* (2013.01); *C08K 7/06* (2013.01); *C08K 7/14* (2013.01); *C08L 65/00* (2013.01); *C08L 79/08* (2013.01); *C08G 2261/3442* (2013.01); *C08L 2205/025* (2013.01); *C08L 2205/03* (2013.01)

(58) Field of Classification Search
CPC ........................................................ C08K 7/02
USPC ........................................................ 524/495
See application file for complete search history.

(56) References Cited

U.S. PATENT DOCUMENTS

| | | |
|---|---|---|
| 3,635,895 A | 1/1972 | Kramer |
| 3,875,116 A | 4/1975 | Heath et al. |
| 4,001,184 A | 1/1977 | Scott |
| 4,217,438 A | 8/1980 | Brunelle et al. |
| 4,690,997 A | 9/1987 | Cella et al. |
| 4,808,686 A | 2/1989 | Cella et al. |
| 5,229,482 A | 7/1993 | Brunelle |
| 5,580,918 A * | 12/1996 | Morita ............. C08L 71/00 524/413 |

(Continued)

FOREIGN PATENT DOCUMENTS

CN       102245678 A    11/2011

*Primary Examiner* — Ling Siu Choi
*Assistant Examiner* — Thuy-Ai N Nguyen
(74) *Attorney, Agent, or Firm* — Baker Hostetler LLP

(57) ABSTRACT

Disclosed herein are methods and fiber reinforced thermoplastic composition comprising: a polyaryletherketone (PAEK) component; a polyimide component, wherein the polyimide component comprises a blend of at least a first polyimide (PI) having glass transition temperature of at least 300° C. and a second polyimide (PI) having glass transition temperature less than the glass transition temperature of the first polyimide; and a reinforcement fiber component. The resulting fiber reinforced thermoplastic compositions exhibit improved mechanical performance.

37 Claims, 3 Drawing Sheets

(56) References Cited

U.S. PATENT DOCUMENTS

| | | | |
|---|---|---|---|
| 5,725,769 A * | 3/1998 | Miller | C08G 73/1042 |
| | | | 210/490 |
| 6,355,723 B1 | 3/2002 | van Baal et al. | |
| 6,919,422 B2 | 7/2005 | Gallucci et al. | |
| 7,041,773 B2 | 5/2006 | Gallucci et al. | |
| 7,786,246 B2 | 8/2010 | Jansen et al. | |
| 8,075,824 B2 * | 12/2011 | Yoshinaga | C08G 73/1039 |
| | | | 264/212 |
| 2007/0066739 A1 | 3/2007 | Odle et al. | |
| 2010/0159224 A1 | 6/2010 | Donovan et al. | |
| 2012/0127565 A1 * | 5/2012 | Haralur | G02B 1/041 |
| | | | 359/356 |

* cited by examiner

FIBER REINFORCED POLYARYLETHERKETONE RESIN COMPOSITIONS

FIELD OF THE INVENTION

The present invention relates generally to thermoplastic compositions having improved properties. The compositions generally comprise a thermoplastic polymer component comprising a polyaryletherketone (PAEK) component; a reinforcement fiber component; and a polyimide component.

BACKGROUND OF THE INVENTION

Polyaryletherketone (PAEK) resins, for example polyarylketones, polyetherketones and polyetheretherketones exhibit very desirable properties, such as solvent resistance, flame resistance, low wear rate, abrasion resistance and high strength. However, the relatively low glass transition temperatures (Tg) of these crystalline resins limit their use at higher temperatures under load. The high temperature load bearing capacity of PAEK compounds can be improved by blending them with polyimide resins. Reinforcement of thermoplastic resins with suitable carbon or glass fibers can improve the stiffness and strength of the resins significantly.

Compared to carbon fiber or glass fiber reinforced polyaryletherketone compounds, however, polyimide-polyetherketone blends exhibit lower impact strength as well as lower tensile and flexural strength at room temperature. Accordingly, there remains a need for fiber reinforced thermoplastic materials that can exhibit improved tensile, flexural and impact strength. This need and other needs are satisfied by the various aspects of the present disclosure.

SUMMARY OF THE INVENTION

In accordance with the purposes of the invention, as embodied and broadly described herein, the invention provides a fiber reinforced thermoplastic composition comprising: a) a thermoplastic polymer blend comprising: i) a polyaryletherketone (PAEK) component; and ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and b) a reinforcement fiber component.

In a still further exemplary aspect, the invention relates to a fiber reinforced thermoplastic composition comprising: a) from 30 weight percent to less than 100 weight percent of the thermoplastic polymer blend comprising: i) a polyaryletherketone (PAEK) component; and ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and b) from greater than 0 to 70 weight percent of the reinforcement fiber component.

In a still further exemplary aspect, the invention relates to a fiber reinforced thermoplastic composition, comprising: a) from 60 to 90 weight percent of a thermoplastic polymer blend comprising: i) a polyetheretherketone (PEEK) component; and ii) a polyimide component comprising a blend of at least a first polyimide (PI) having glass transition temperature of at least 300° C. and a second polyimide (PI) having glass transition temperature in the range of from 240° C. to 260° C., wherein the second polyimide is present in the polyimide component in a relative weight fraction in the range of from 0.2 to 0.8 relative to the total weight of the polyimide component; and b) from greater than 10 to 40 weight percent of a reinforcement fiber component.

In a still further exemplary aspect, the invention relates to a method for forming a thermoplastic blend comprising: a) combining: i) a polyaryletherketone (PAEK) component; ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and iii) a reinforcement fiber component.

In further aspects, the invention also relates to articles comprising the disclosed compositions and articles made using the disclosed methods.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DETAILED DESCRIPTION OF THE INVENTION

Figure 1:
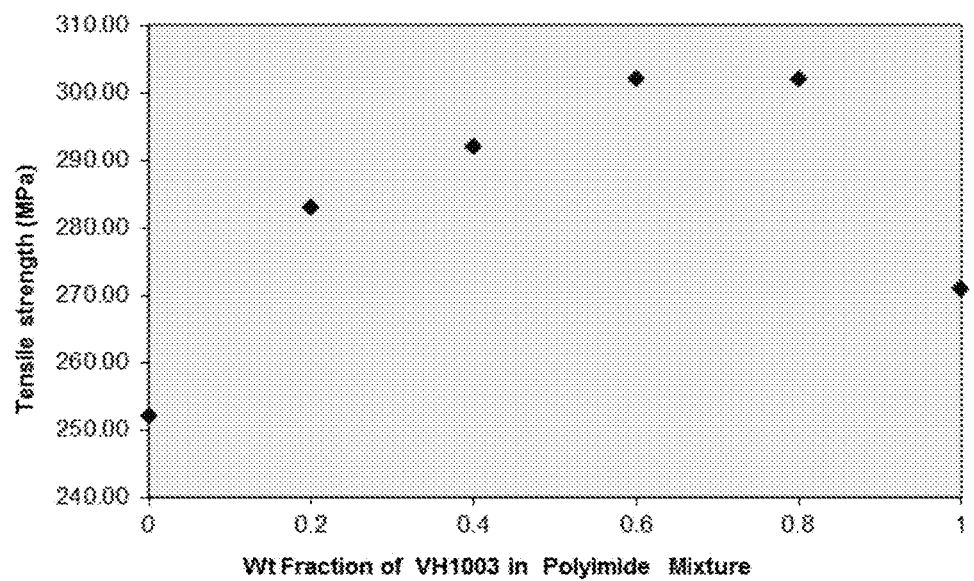
FIG. 1 is a graph showing the tensile strength performance of composites at different weight fraction of the second polyimide P2 in accordance with the present invention.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polyimide polymer" includes mixtures of two or more polyimide polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

As used herein, the term "substantially identical reference composition" refers to a composition that is substantially identical to the inventive composition by consisting essentially of substantially the same proportions and components but in the absence of a stated component. For example and without limitation, in some aspects of the invention, for purposes of comparison to a corresponding reference composition, as used herein, corresponding reference composition consists essentially of the same component materials in the same component amounts as the inventive composition but for the absence of the second polyimide. To that end, in an exemplary corresponding reference composition comprising only a first polyimide, the weight percentage amount of the first polyimide is increased an equivalent amount to compensate for the absence of the second polyimide.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula $AOA^1$, where A and $A^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "organic residue" or "residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

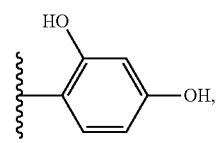 [SMILES: *c1ccc(O)cc1O]

regardless of whether 2,4-dihydroxyphenyl is used to prepare the compound. In some aspects the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some aspects, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Fiber Reinforced Thermoplastic Resin Composition

As used herein, fiber reinforced thermoplastic resin composition is synonymous with fiber reinforced thermoplastic resin composition, thermoplastic composition, resin composition, resin, composition, fiber reinforced thermoplastic resin composite, thermoplastic composite, resin composite, or composite.

As briefly described above, the present disclosure relates, in one aspect, to a fiber reinforced thermoplastic composition comprising: a) a thermoplastic polymer blend comprising: i) a polyaryletherketone (PAEK) component; and ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and b) a reinforcement fiber component.

In further aspects, described herein is a fiber reinforced thermoplastic composition comprising: a) from 30 weight percent to less than 100 weight percent of the thermoplastic polymer blend comprising: i) a polyaryletherketone (PAEK) component; and ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and b) from greater than 0 to 70 weight percent of the reinforcement fiber component.

In further aspects, described herein is a fiber reinforced thermoplastic composition, comprising: a) from 60 to 90 weight percent of a thermoplastic polymer blend comprising: i) a polyetheretherketone (PEEK) component; and ii) a polyimide component comprising a blend of at least a first polyimide (PI) having glass transition temperature of at least 300° C. and a second polyimide (PI) having glass transition temperature in the range of from 240° C. to 260° C., wherein the second polyimide is present in the polyimide component in a relative weight fraction in the range of from 0.2 to 0.8 relative to the total weight of the polyimide component; and b) from greater than 10 to 40 weight percent of a reinforcement fiber component.

1. Polyaryletherketone (PAEK) Polymer

In one aspect, the disclosed fiber reinforced thermoplastic resin compositions of the present invention comprise a polyaryletherketone component. In one aspect, the polyaryletherketone component is a polyaryletherketone polymer composition or material. In various aspects, the disclosed fiber reinforced thermoplastic resin compositions can have useful mechanical properties such as improved tensile, flexural, and impact strength.

In a further aspect, the polyaryletherketone component can comprise any polyaryletherketone polymer or material, or mixture of polyaryletherketone polymers or materials, including, for example, polyetheretherketone polymers (PEEK), polyetherketone polymers (PEK), polyetherketoneketone polymers (PEKK), polyetherketoneetherketoneketone polymers (PEKEKK), and polyetheretherketoneketone polymers (PEEKK), or combinations thereof.

In a further aspect, the disclosed fiber reinforced thermoplastic resin compositions comprise a polyetheretherketone component. As used herein, the term "polyetheretherketone component" is understood to refer to both polyetheretherketone homopolymers and polyetheretherketone copolymers. Thus, in a still further aspect, the disclosed fiber reinforced thermoplastic resin compositions can comprise one or more polyetheretherketone copolymers. In a yet further aspect, the disclosed fiber reinforced thermoplastic resin compositions can comprise one or more polyetheretherketone homopolymers.

In various aspects, the polyaryletherketone component comprises repeating units having structure represented by the formula:

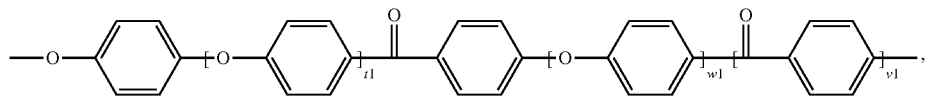

wherein t1, and w1 independently is 0 or 1 and v1 is 0, 1 or 2. In a further aspect, t1 is 1, v1 is 0, and w1 is 0. In a still further aspect, t1 is 0, v1 is 0, and w1 is 0. In a yet further aspect, t1 is 0, w1 is 1, and v1 is 2. In an even further aspect, t1 is 0, v1 is 1, and w1 is 0. In a still further aspect, t1 is 1, v1 is 0 and w1 is 0.

In a further aspect, the polyaryletherketone component can comprise a moiety having a structure represented by the formula (I):

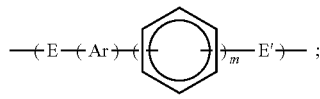 (I)

and/or a moiety having a structure represented by the formula (II):

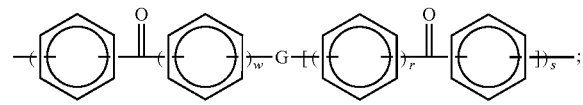 (II)

and/or a moiety having a structure represented by the formula (III):

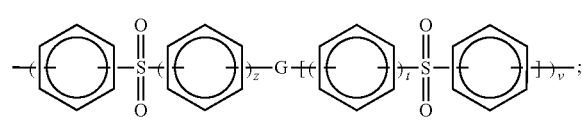 (III)

wherein each of m, r, s, t, v, w and z independently represent zero or a positive integer; wherein each of E and E' independently represent an oxygen or a sulfur atom or a direct link; wherein G represents an oxygen or sulfur atom, a direct link or a —O-Ph-O— moiety; wherein Ph represents a phenyl group that is bonded via one or more of its phenyl moieties to adjacent moieties; and wherein Ar is bonded via one or more of its phenyl moieties to adjacent moieties and is a moiety selected from a structure represented by one of the following formulas:

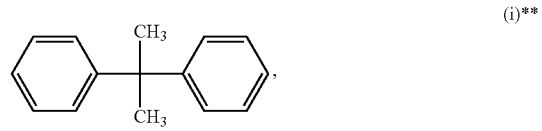 (i)**

-continued

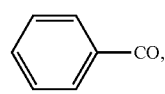 (i)

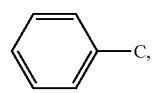 (ii)

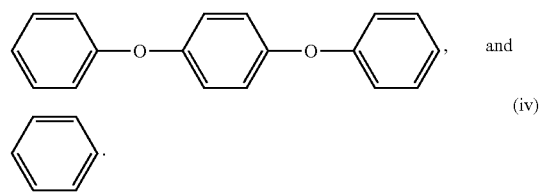 (iii)

and (iv)

It is understood that the polyaryletherketone component can include more than one type of each of the moieties described above. For example, the polyaryletherketone component can include more than one type of moiety described by formula I. Alternatively, the polyaryletherketone component can include more than one type of moiety described by formula II. In a further alternative, the polyaryletherketone component can include more than one type of moiety described by formula III. In various further aspects, the polyaryletherketone can include only type of each of moiety described by formula I, II, and/or III.

In one aspect, a phenyl moiety has 1,4-linkages to moieties to which it is bonded. In a further aspect, a phenyl moiety does not have 1,4-linkages to moieties to which it is bonded. In a still further aspect, when w is greater than zero, the respective phenylene moieties can each independently have 1,4- and 1,3-linkages to other moieties in the repeat units of formula II. In a yet further aspect, when w is greater than zero, the respective phenylene moieties can each independently have 1,4-linkages to other moieties in the repeat units of formula II.

In various aspects, the moiety represented by formula (i), when present, the middle phenyl the moiety can be 1,4- or 1,3-substituted. In a further aspect, the moiety represented by formula (i), when present, the middle phenyl the moiety can be 1,3-substituted. In a still further aspect, the moiety represented by formula (i), when present, the middle phenyl the moiety can be 1,3-substituted.

The level of crystallinity in the polyaryletherketone can vary as appropriate to obtain the desired properties of tensile, flexural, and impact strength for the disclosed fiber reinforced thermoplastic resin compositions of the present invention. For example the level of crystallinity in the polyaryletherketone can be at least 1%, at least 3%, at least 5%, and at least 10%. Alternatively, it can be desirable to have a higher level of crystallinity in the polyaryletherketone, for example at least 30%, at least 40%, and at least 45%.

In a further aspect, the glass transition temperature ($T_g$) of the polyaryletherketone component can be at least 140° C., at least 142° C., at least 144° C., at least 146° C., at least 148° C., at least 150° C., at least 152° C., at least 154° C., at least 156° C., at least 158° C., at least 160° C., at least 162° C., at least 164° C., at least 166° C., at least 168° C., at least 170° C., at least 180° C., at least 190° C., at least 200° C., at least 210° C., at least 220° C., at least 230° C., at least 240° C., at least 250° C., and at least 300° C. In a still further aspect, the glass transition temperature ($T_g$) of the polyaryletherketone component can be from about 140° C. to about 150° C. In a yet further aspect, the glass transition temperature ($T_g$) of the polyaryletherketone component can be from about 140° C. to about 145° C.

In various aspects, the polyaryletherketone component, if crystalline, can have a melting endotherm (Tm) with a main peak of at least 300° C.

In further aspects, the polyaryletherketone component has a melt viscosity in the range of from 50 to 800 Pascal-seconds measured at 400° C. and under a shear rate of 1000/s, including exemplary values of 100, 150, 200, 250, 300, 350, 400, 450, 500, 550, 600, 650, 700, and 750 Pascal-seconds. In further aspects, the melt viscosity can be in a range derived from any two of the above listed exemplary values, for example, a melt viscosity in the range of from 70 to 500 Pascal-seconds or a melt viscosity in the range of from 90 to 300 Pascal-seconds measured at 400° C. and under a shear rate of 1000/s.

In a further aspect, the polyaryletherketone component of the fiber reinforced thermoplastic resin composition is present in an amount ranging from about 5 wt % to less than 100 wt %, including exemplary values of 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, and 90 wt %, relative to the total weight of the composition. In a still further aspect, the wt % can be in a range derived from any two of the above listed exemplary wt % values. In a yet further aspect, the polyaryletherketone component of the fiber reinforced thermoplastic resin composition can be present in an amount ranging from about 5 wt % to about 90 wt %, relative to the total weight of the composition. In an even further aspect, the polyaryletherketone component of the fiber reinforced thermoplastic resin composition can be present in an amount ranging from about 30 wt % to about 90 wt %, relative to the total weight of the composition. In a still further aspect, the polyaryletherketone component of the fiber reinforced thermoplastic resin composition can be present in an amount from about 20 wt % to about 80 wt %. In a yet further aspect, the polyaryletherketone component of the fiber reinforced thermoplastic resin composition can be present in an amount ranging from about 30 wt % to about 60 wt %, relative to the total weight of the composition.

In a further aspect, an example of suitable polyaryletherketone (PAEK) polymers include, but are not limited to, such PEEK polymers as VICTREX® PEEK 150P or VICTREX PEEK® 150PF (commercially available from Victrex USA, Inc., West Conshohocken, Pa.).

2. Polyimide Component

In one aspect, the disclosed fiber reinforced thermoplastic resin composition of the present invention comprises a polyimide component. In a further aspect, the disclosed fiber reinforced thermoplastic resin composition comprises one or more polyimides. In a still further aspect, the disclosed fiber reinforced thermoplastic resin composition comprises at least one polyimide. In a yet further aspect, the disclosed fiber reinforced thermoplastic resin composition comprises an polyimide component comprising two polyimides, that is, a first polyimide and a second polyimide.

In one aspect, polyimides can comprise polyetherimides and polyetherimides copolymers. The polyetherimide can be selected from (i) polyetherimidehomopolymers, e.g., polyetherimides, (ii) polyetherimide co-polymers, e.g., polyetherimidesulfones, and (iii) combinations thereof. Polyetherimides are known polymers and are sold by SABIC Innovative Plastics under the ULTEM®*, EXTEM®*, and Siltem* brands (Trademark of SABIC Innovative Plastics IP B.V.).

In an aspect, the polyetherimides can be of formula (1):

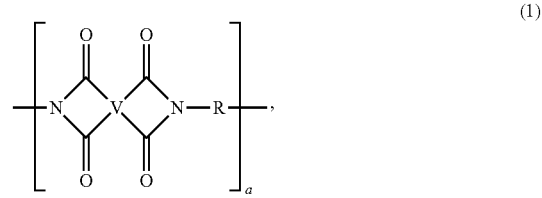

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

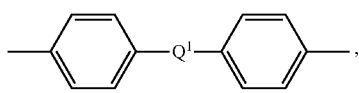
(2)

wherein Q1 includes but is not limited to a divalent moiety such as —O—, —S—, —C(O)—, —SO2-, —SO—, —CyH2y- (y being an integer from 1 to 5), and halogenated derivatives thereof, including perfluoroalkylene groups.

In various aspects, linkers V include but are not limited to tetravalent aromatic groups of formula (3):

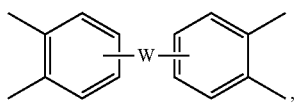
(3)

wherein W is a divalent moiety including —O—, —SO2-, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

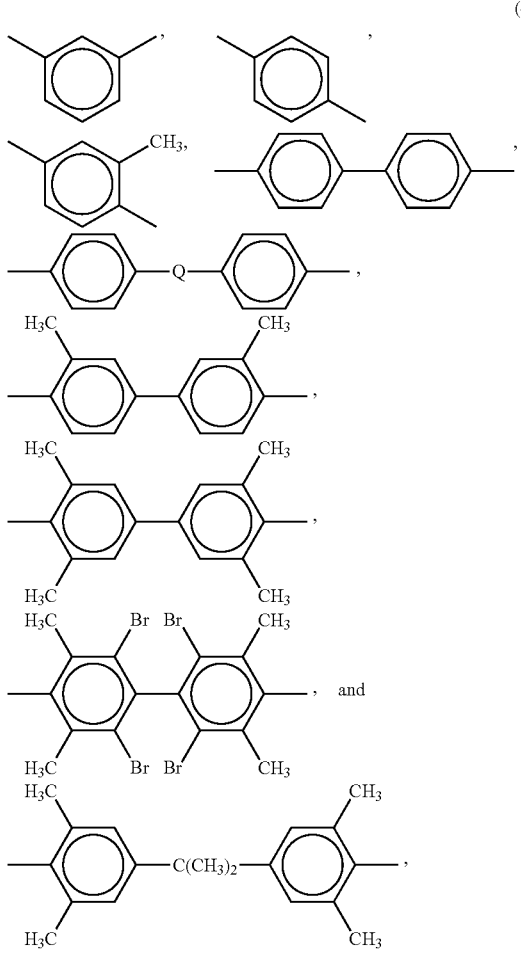
(4)

wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In other aspects, the polyetherimide comprises more than 1, specifically 10 to 1,000, or more specifically, 10 to 500 structural units, of formula (5):

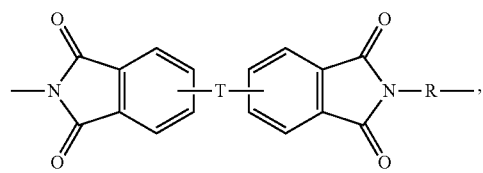
(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another aspect, the polyetherimidesulfones are polyetherimides comprising ether groups and sulfone groups wherein at least 50 mole % of the linkers V and the groups R in formula (1) comprise a divalent arylenesulfone group. For example, all linkers V, but no groups R, can contain an arylenesulfone group; or all groups R but no linkers V can contain an arylenesulfone group; or an arylenesulfone can be present in some fraction of the linkers V and R groups, provided that the total mole fraction of V and R groups containing an aryl sulfone group is greater than or equal to 50 mole %.

In even further aspects, polyetherimidesulfones can comprise more than 1, specifically 10 to 1,000, or more specifically, 10 to 500 structural units of formula (6):

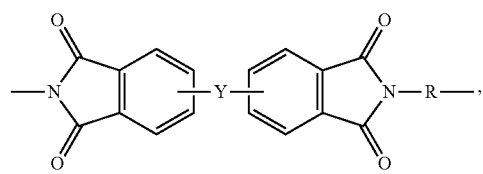
(6)

wherein Y is —O—, —SO2-, or a group of the formula —O—Z—O— wherein the divalent bonds of the —O—, SO2-, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO2- groups.

It is to be understood that the polyetherimides and polyetherimidesulfones can optionally comprise linkers V that do not contain ether or ether and sulfone groups, for example linkers of formula (7):

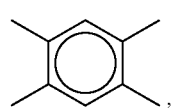
(7)

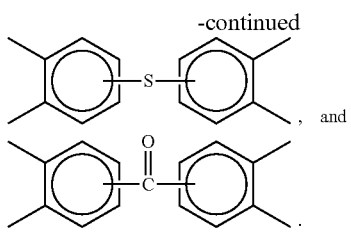

Imide units containing such linkers are generally present in amounts ranging from 0 to 10 mole % of the total number of units, specifically 0 to 5 mole %. In some aspects, no additional linkers V are present in the polyetherimides and polyetherimidesulfones.

In other aspects, the polyetherimide comprises 10 to 500 structural units of formula (5) and the polyetherimidesulfone contains 10 to 500 structural units of formula (6).

Polyetherimides and polyetherimidesulfones can be prepared by any suitable process. In one embodiment, polyetherimides and polyetherimide copolymers include polycondensation polymerization processes and halo-displacement polymerization processes.

Polycondensation methods can include a method for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO2 in what is known as the nitro-displacement step. After purification, the BPA-bisimide is reacted with phthalic anhydride in an imide exchange reaction to afford BPA-dianhydride (BPADA), which in turn is reacted with a diamine such as meta-phenylene diamine (MPD) in ortho-dichlorobenzene in an imidization-polymerization step to afford the product polyetherimide.

Other diamines are also possible. Examples of suitable diamines include: m-phenylenediamine; p-phenylenediamine; 2,4-diaminotoluene; 2,6-diaminotoluene; m-xylylenediamine; p-xylylenediamine; benzidine; 3,3'-dimethylbenzidine; 3,3'-dimethoxybenzidine; 1,5-diaminonaphthalene; bis(4-aminophenyl)methane; bis(4-aminophenyl)propane; bis(4-aminophenyl)sulfide; bis(4-aminophenyl)sulfone; bis(4-aminophenyl)ether; 4,4'-diaminodiphenylpropane; 4,4'-diaminodiphenylmethane(4,4'-methylenedianiline); 4,4'-diaminodiphenylsulfide; 4,4'-diaminodiphenylsulfone; 4,4'-diaminodiphenylether(4,4'-oxydianiline); 1,5-diaminonaphthalene; 3,3'dimethylbenzidine; 3-methylheptamethylenediamine; 4,4-dimethylheptamethylenediamine; 2,2',3,3'-tetrahydro-3,3,3',3'-tetramethyl-1,1'-spirobi[1H-indene]-6,6'-diamine; 3,3',4,4'-tetrahydro-4,4,4',4'-tetramethyl-2,2'-spirobi[2H-1-benzo-pyran]-7,7'-diamine; 1,1'-bis[1-amino-2-methyl-4-phenyl]cyclohexane, and isomers thereof as well as mixtures and blends comprising at least one of the foregoing. In one embodiment, the diaminesare specifically aromatic diamines, especially m- and p-phenylenediamine and mixtures comprising at least one of the foregoing.

Suitable dianhydrides that can be used with the diamines include and are not limited to 2,2-bis[4-(3,4-dicarboxyphenoxy)phenyl]propane dianhydride; 4,4'-bis(3,4-dicarboxyphenoxy)diphenyletherdianhydride; 4,4'-bis(3,4-dicarboxyphenoxy)diphenylsulfidedianhydride; 4,4'-bis(3,4-dicarboxyphenoxy)benzophenonedianhydride; 4,4'-bis(3,4-dicarboxyphenoxy)diphenylsulfonedianhydride; 2,2-bis[4-(2,3-dicarboxyphenoxy)phenyl]propane dianhydride; 4,4'-bis(2,3-dicarboxyphenoxy)diphenyletherdianhydride; 4,4'-bis(2,3-dicarboxyphenoxy)diphenylsulfidedianhydride; 4,4'-bis(2,3-dicarboxyphenoxy)benzophenonedianhydride; 4,4'-bis(2,3-dicarboxyphenoxy)diphenylsulfonedianhydride; 4-(2,3-dicarboxyphenoxy)-4'-(3,4-dicarboxyphenoxyl)diphenyl-2,2-propane dianhydride; 4-(2,3-dicarboxyphenoxy)-4'-(3,4-dicarboxyphenoxy)diphenyletherdianhydride; 4-(2,3-dicarboxyphenoxy)-4'-(3,4-dicarboxyphenoxy)diphenylsulfide dianhydride; 4-(2,3-dicarboxyphenoxy)-4'-(3,4-dicarboxyphenoxy)benzophenonedianhydride; 4-(2,3-dicarboxyphenoxy)-4'-(3,4-dicarboxyphenoxyl)diphenylsulfone dianhydride; 1,3-bis(2,3-dicarboxyphenoxy)benzene dianhydride; 1,4-bis(2,3-dicarboxyphenoxy)benzene dianhydride; 1,3-bis(3,4-dicarboxyphenoxy)benzene dianhydride; 1,4-bis(3,4-dicarboxyphenoxy)benzene dianhydride; 3,3',4,4'-diphenyl tetracarboxylicdianhydride; 3,3',4,4'-benzophenonetetracarboxylic dianhydride; naphthalicdianhydrides, such as 2,3,6,7-naphthalic dianhydride, etc.; 3,3',4,4'-biphenylsulphonic-tetracarboxylic dianhydride; 3,3',4,4'-biphenylethertetracarboxylic dianhydride; 3,3',4,4'-dimethyldiphenylsilanetetracarboxylic dianhydride; 4,4'-bis (3,4-dicarboxyphenoxy)diphenylsulfidedianhydride; 4,4'-bis (3,4-dicarboxyphenoxy)diphenylsulphonedianhydride; 4,4'-bis (3,4-dicarboxyphenoxy)diphenylpropanedianhydride; 3,3',4,4'-biphenyltetracarboxylic dianhydride; bis(phthalic)phenylsulphineoxidedianhydride; p-phenylene-bis (triphenylphthalic)dianhydride; m-phenylene-bis (triphenylphthalic)dianhydride; bis(triphenylphthalic)-4,4'-diphenylether dianhydride; bis(triphenylphthalic)-4,4'-diphenylmethane dianhydride; 2,2'-bis(3,4-dicarboxyphenyl)hexafluoropropanedianhydride; 4,4'-oxydiphthalic dianhydride; pyromelliticdianhydride; 3,3',4,4'-diphenylsulfonetetracarboxylic dianhydride; 4',4'-bisphenol A dianhydride; hydroquinone diphthalic dianhydride; 6,6'-bis(3,4-dicarboxyphenoxy)-2,2',3,3'-tetrahydro-3,3,3',3'-tetramethyl-1,1'-spirobi[1H-indene]dianhydride; 7,7'-bis(3,4-dicarboxyphenoxy)-3,3',4,4'-tetrahydro-4,4,4',4'-tetramethyl-2,2'-spirobi[2H-1-benzopyran] dianhydride; 1,1'-bis[1-(3,4-dicarboxyphenoxy)-2-methyl-4-phenyl]cyclohexane dianhydride; 3,3',4,4'-diphenylsulfonetetracarboxylic dianhydride; 3,3',4,4'-diphenylsulfidetetracarboxylic dianhydride; 3,3',4,4'-diphenylsulfoxidetetracarboxylic dianhydride; 4,4'-oxydiphthalic dianhydride; 3,4'-oxydiphthalic dianhydride; 3,3'-oxydiphthalic dianhydride; 3,3'-benzophenonetetracarboxylic dianhydride; 4,4'-carbonyldiphthalic dianhydride; 3,3',4,4'-diphenylmethanetetracarboxylic dianhydride; 2,2-bis(4-(3,3-dicarboxyphenyl)propane dianhydride; 2,2-bis(4-(3,3-dicarboxyphenyl)hexafluoropropanedianhydride; (3,3',4,4'-diphenyl)phenylphosphinetetracarboxylicdianhydride; (3,3',4,4'-diphenyl)phenylphosphineoxidetetracarboxylicdianhydride; 2,2'-dichloro-3,3',4,4'-biphenyltetracarboxylic dianhydride; 2,2'-dimethyl-3,3',4,4'-biphenyltetracarboxylic dianhydride; 2,2'-dicyano-3,3',4,4'-biphenyltetracarboxylic dianhydride; 2,2'-dibromo-3,3',4,4'-biphenyltetracarboxylic dianhydride; 2,2'-diiodo-3,3',4,4'-biphenyltetracarboxylic dianhydride; 2,2'-ditrifluoromethyl-3,3',4,4'-biphenyltetracarboxylic dianhydride; 2,2'-bis(1-methyl-4-phenyl)-3,3',4,4'-biphenyltetracarboxylic dianhydride; 2,2'-bis(1-trifluoromethyl-2-phenyl)-3,3',4,4'-biphenyltetracarboxylic dianhydride; 2,2'-bis(1-trifluoromethyl-3-phenyl)-3,3',4,4'- biphenyltetracarboxylic dianhydride; 2,2'-bis(1-trifluoromethyl-4-phenyl)-3,3',4,4'-biphenyltetracarboxylic dianhydride; 2,2'-bis(1-phenyl-4-phenyl)-3,3',4,4'-biphenyltetracarboxylic dianhydride; 4,4'-bisphenol A dianhydride; 3,4'-bisphenol A dianhydride; 3,3'-bisphenol A dianhydride; 3,3',4,4'-diphenylsulfoxidetetracarboxylic dianhydride; 4,4'-carbonyldiphthalic dianhydride; 3,3',4,4'-diphenylmethanetetracarboxylic dianhydride; 2,2'-bis(1,3-trifluoromethyl-4-phenyl)-3,3',4,4'-biphenyltetracarboxylic dianhydride, and all isomers thereof, as well as combinations of the foregoing.

Halo-displacement polymerization methods for making polyetherimides and polyetherimidesulfones include and are not limited to, the reaction of a bis(phthalimide) for formula (8):

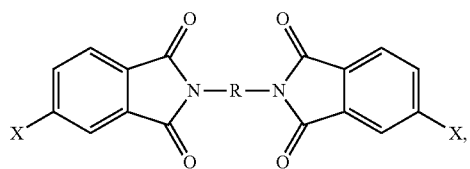

(8)

wherein R is as described above and X is a nitro group or a halogen. Bis-phthalimides (8) can be formed, for example, by the condensation of the corresponding anhydride of formula (9):

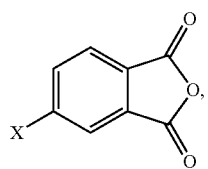

(9)

wherein X is a nitro group or halogen, with an organic diamine of the formula (10):

H$_2$N—R—NH$_2$ (10), wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) ether and 1,3-bis(3-aminopropyl) tetramethyldisiloxane. Mixtures of these amines can be used. Illustrative examples of amine compounds of formula (10) containing sulfone groups include but are not limited to, diaminodiphenylsulfone (DDS) and bis(aminophenoxy phenyl) sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In some aspects, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimidesulfone comprises structural units of formula (6) wherein at least 50 mole % of the R groups are of formula (4) wherein Q is —SO2- and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimidesulfone can be used alone or in combination with each other and/or other of the disclosed polymeric materials in fabricating the polymeric components of the invention. In one aspect, only the polyetherimide is used. In another aspect, the weight ratio of polyetherimide:polyetherimidesulfone can be from 99:1 to 1:99.

The polyetherimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 500° C., as measured using differential scanning calorimetry (DSC) per ASTM test D3418, including exemplary glass transition temperatures of 250° C., 260° C., 270° C., 280° C., 290° C., 300° C., 310° C., 320° C., 330° C., 340° C., 350° C., 360° C., 370° C., 380° C., 390° C., 400° C., 410° C., 420° C., 430° C., 440° C., 450° C., 460° C., 470° C., 480° C., and 490° C. In further aspects, the glass transition temperature can be in a range derived from any two of the above listed values. For example, according to some aspects, the polyetherimide has a glass transition temperature of less than about 300° C., for example, a glass transition temperature of less than 290, 280, 270, 260, or 250° C. In other aspects, the polyetherimide has a glass transition temperature of greater than 300° C., for example, a glass transition temperature of greater than 310° C., 320° C., 330° C., 340° C., or 350° C. In yet further aspects, the polyetherimide has a glass transition temperature in the range of from about 300° C. to about 320° C.

The polyetherimides can have a melt index of 0.1 to 10 grams per minute (g/min), as measured by American Society for Testing Materials (ASTM) DI 238 at 340 to 370° C., using a 6.7 kilogram (kg) weight.

An alternative halo-displacement polymerization process for making polyetherimides, e.g., polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischlorophthalimide of meta-phenylene diamine (CAS No. 148935-94-8). The bischlorophthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischlorophthalimides which may be polymerized by chloro-displacement with BPA disodium salt as described above.

Siloxane polyetherimides can include polysiloxane/polyetherimide block copolymers having a siloxane content of greater than 0 and less than 40 weight percent (wt %) based on the total weight of the block copolymer. The block copolymer comprises a siloxane block of Formula (I):

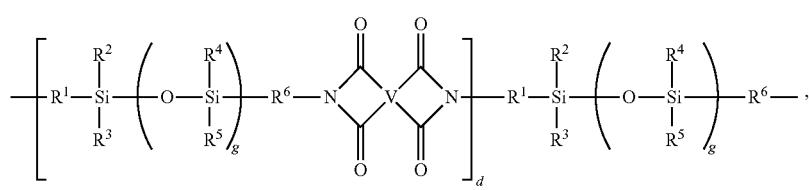

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyetherimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyetherimide resin can have a weight average molecular weight (Mw) from 5,000 to 100,000 daltons, from 5,000 to 80,000 daltons, or from 5,000 to 70,000 daltons. The primary alkyl amine modified polyetherimide will have lower molecular weight and higher melt flow than the starting, unmodified, polyetherimide.

The polyetherimide resin can be selected from the group consisting of a polyetherimide, for example as described in U.S. Pat. Nos. 3,875,116; 6,919,422 and 6,355,723 a silicone polyetherimide, for example as described in U.S. Pat. Nos. 4,690,997; 4,808,686 a polyetherimidesulfone resin, as described in U.S. Pat. No. 7,041,773 and combinations thereof, each of these patents are incorporated herein in their entirety.

The polyetherimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, 300 and 310 degrees Celsius. For example, the polyetherimide resin can have a glass transition temperature (Tg) greater than about 200 degrees Celsius.

In certain aspects, the polyetherimide component comprises a polyetherimide polymer having a structure comprising structural units represented by a organic radical of formula (I):

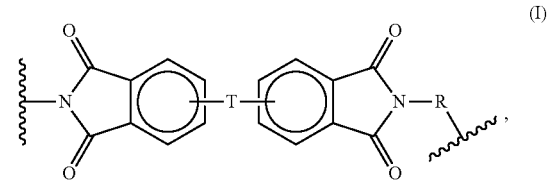

wherein R in formula (I) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (II):

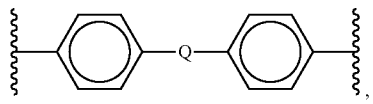

(II)

wherein Q includes a divalent moiety selected from the group consisting of a single bond, —O—, —S—, —C(O)—, —SO2-, —SO—, —CyH2y- (y being an integer from 1 to 5), and halogenated derivatives thereof, including perfluoroalkylene groups; wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III):

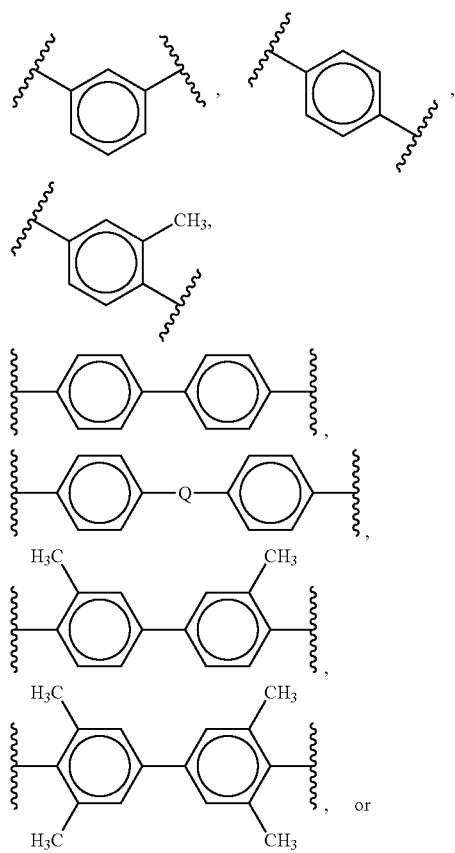

(III)

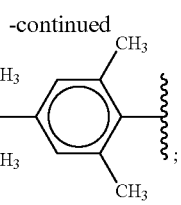

and wherein the polyetherimides which are included by formula (I) have a Mw of at least about 40,000.

In a further aspect, the polyetherimide polymer may be a copolymer, which, in addition to the etherimide units described above, further contains polyimide structural units of the formula (IV):

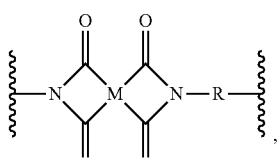

(IV)

wherein R is as previously defined for formula (I) and M includes, but is not limited to, radicals of formula (V):

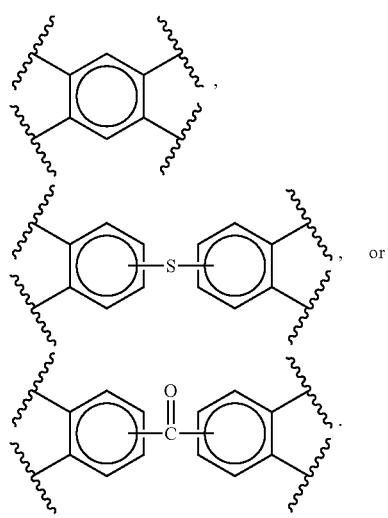

(V)

In a further aspect, the polyimide component comprises a polyetherimide polymer having a structure represented by a formula:

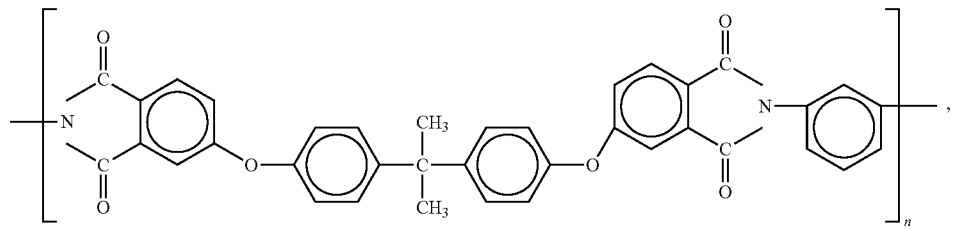

wherein the polyetherimide polymer has a molecular weight of at least 40,000 Daltons, 50,000 Daltons, 60,000 Daltons, 80,000 Daltons, or 100,000 Daltons. In a still further aspect, n is any integer greater than 1.

In further aspects, the polyimide component comprises a polyetherimide polymer having a structure represented by a formula:

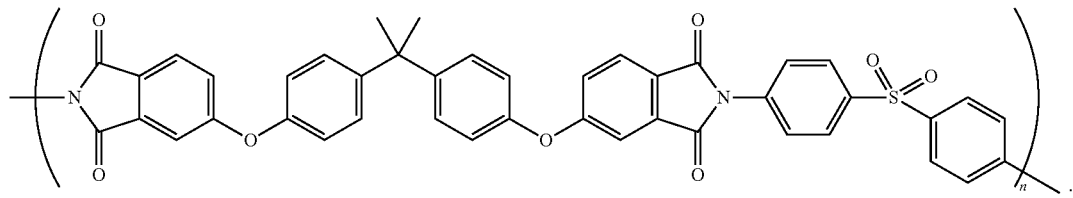

In still further aspects, n is any integer greater than 1.

In still further exemplary aspects, the polyimide component comprises a polyetherimide polymer having a structure represented by a formula:

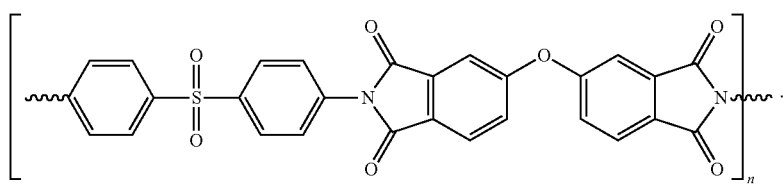

In yet further aspects, n is any integer greater than 1.

In further aspects, the polyetherimide polymer can be prepared by methods known to one skilled in the art, including the reaction of an aromatic bis(ether anhydride) of the formula (VI):

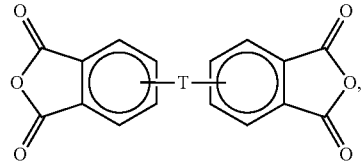

(VI)

with an organic diamine of the formula (VII):

H$_2$N—R—NH$_2$ (VII), wherein T and R are defined as described above in formula (I).

Illustrative, non-limiting examples of aromatic bis(ether anhydride)s of formula (VI) include 2,2-bis[4-(3,4-dicarboxyphenoxyl)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxyl)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxyl)diphenyl-2,2-propane dianhydride; 4-(2,3-dicarboxyphenoxy)-4'-(3,4-dicarboxyphenoxyl)diphenyl ether dianhydride; 4-(2,3-dicarboxyphenoxy)-4'-(3,4-dicarboxyphenoxyl)diphenyl sulfide dianhydride; 4-(2,3-dicarboxyphenoxy)-4'-(3,4-dicarboxyphenoxyl)benzophenone dianhydride and 4-(2,3-dicarboxyphenoxy)-4'-(3,4-dicarboxyphenoxyl)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A useful class of aromatic bis(ether anhydride)s included by formula (VI) above includes, but is not limited to, compounds wherein T is of the formula (VIII):

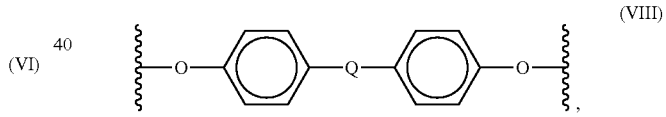

(VIII)

and the ether linkages, for example, are beneficially in the 3,3', 3,4', 4,3', or 4,4' positions, and mixtures thereof, and where Q is as defined above.

Any diamino compound may be employed in the preparation of the polyimides and/or polyetherimides. Illustrative, non-limiting examples of suitable diamino compounds of formula (VII) include ethylenediamine, propylenediamine, trimethylenediamine, diethylenetriamine, triethyleneteramine, hexamethylenediamine, heptamethylenediamine, octamethylenediamine, nonamethylenediamine, decamethylenediamine, 1,12-dodecane diamine, 1,18-octadecanediamine, 3-methylheptamethylenediamine, 4,4-dimethylheptamethylenediamine, 4-methylnonamethylenediamine, 5-methylnonamethylene diamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylene diamine, 1,2-bis(3-aminopropoxy) ethane, bis(3-aminopropyl) sulfide, 1,4-cyclohexane diamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropyl benzene, bis(4-aminophenyl) sulfide, bis(4-aminophenyl) sulfone, bis(4-aminophenyl) ether and 1,3-bis(3-aminopropyl) tetramethyldisiloxane. Mixtures of these compounds may also be present. Beneficial diamino compounds are aromatic diamines, especially m- and p-phenylenediamine and mixtures thereof.

In a further aspect, the polyetherimide resin includes structural units according to formula (I) wherein each R is independently p-phenylene or m-phenylene or a mixture thereof and T is a divalent radical of the formula (IX):

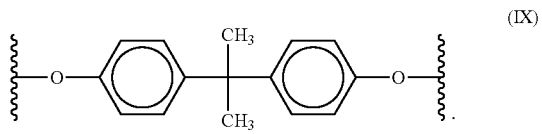

In various aspects, the reactions can be carried out employing solvents such as o-dichlorobenzene, m-cresol/toluene, or the like, to effect a reaction between the anhydride of formula (VI) and the diamine of formula (VII), at temperatures of about 100° C. to about 250° C. Alternatively, the polyetherimide can be prepared by melt polymerization of aromatic bis(ether anhydride)s of formula (VI) and diamines of formula (VII) by heating a mixture of the starting materials to elevated temperatures with concurrent stirring. Melt polymerizations can employ temperatures of about 200° C. to about 400° C. Chain stoppers and branching agents can also be employed in the reaction. The polyetherimide polymers can optionally be prepared from reaction of an aromatic bis(ether anhydride) with an organic diamine in which the diamine is present in the reaction mixture at no more than about 0.2 molar excess, and beneficially less than about 0.2 molar excess. Under such conditions the polyetherimide resin has less than about 15 microequivalents per gram (μeq/g) acid titratable groups in one embodiment, and less than about 10 μeq/g acid titratable groups in an alternative embodiment, as shown by titration with chloroform solution with a solution of 33 weight percent (wt %) hydrobromic acid in glacial acetic acid. Acid-titratable groups are essentially due to amine end-groups in the polyetherimide resin.

In some aspects, the polyimide is a polycondensation reaction product of 4,4'-oxydiphthalic dianhydride (ODPA) and 4,4'-diaminodiphenyl sulfone (DDS). In other aspects, the polyimide is a polycondensation reaction product of 4,4'-Bisphenol A dianhyride (BPADA) and 4,4'-diaminodiphenyl sulfone (DDS).

In a further aspect, the polyimide component comprises a polyetherimide resin having a weight average molecular weight (Mw) of at least about 24,000 to about 150,000 grams per mole (g/mole), as measured by gel permeation chromatography, using a polystyrene standard. In a still further aspect, the thermoplastic resin can have a molecular weight of at least 20,000 Daltons, 40,000 Daltons, 50,000 Daltons, 60,000 Daltons, 80,000 Daltons, 100,000 Daltons, or 120,000 Daltons. In a yet further aspect, the thermoplastic resin can have a molecular weight of at least 40,000 Daltons. In an even further aspect, the thermoplastic resin can have a molecular weight of at least 45,000 Daltons. In a still further aspect, the thermoplastic resin can have a molecular weight of at least 50,000 Daltons. In a yet further aspect, the thermoplastic resin can have a molecular weight of at least 60,000 Daltons. In an even further aspect, the thermoplastic resin can have a molecular weight of at least 70,000 Daltons. In a still further aspect, the thermoplastic resin can have a molecular weight of at least 100,000 Daltons.

In various aspects, the polyimide component of the fiber reinforced thermoplastic resin composition comprises a first polyimide and a second polyimide.

In a further aspect, the first polyimide can comprise a polyetherimide polymer having a molecular weight of at least 40,000 Daltons, 50,000 Daltons, 60,000 Daltons, 80,000 Daltons, or 100,000 Daltons. In a yet further aspect, first polyimide has a molecular weight of at least Daltons, 40,000 Daltons or 50,000 Daltons. In a still further aspect, the first polyimide has a molecular weight of at least 40,000 Daltons. In a yet further aspect, first polyimide has a molecular weight of at least 50,000 Daltons. In an even further aspect, first polyimide has a molecular weight of at least 60,000 Daltons. In a still further aspect, first polyimide has a molecular weight of at least 70,000 Daltons. In a yet further aspect, first polyimide has a molecular weight of at least 100,000 Daltons.

In a further aspect, the second polyimide can comprise a polyetherimide polymer having a molecular weight of at least 40,000 Daltons, 50,000 Daltons, 60,000 Daltons, 80,000 Daltons, or 100,000 Daltons. In a yet further aspect, second polyimide has a molecular weight of at least Daltons, 40,000 Daltons or 50,000 Daltons. In a still further aspect, the second polyimide has a molecular weight of at least 40,000 Daltons. In a yet further aspect, second polyimide has a molecular weight of at least 50,000 Daltons. In an even further aspect, second polyimide has a molecular weight of at least 60,000 Daltons. In a still further aspect, second polyimide has a molecular weight of at least 70,000 Daltons. In a yet further aspect, second polyimide has a molecular weight of at least 100,000 Daltons.

According to various aspects of the disclosure, the first polyimide has a glass transition temperature of greater than 300° C., specifically of between 300° C. to 500° C., as measured using differential scanning calorimetry (DSC) per ASTM test D3418, including exemplary glass transition temperatures of 310° C., 320° C., 330° C., 340° C., 350° C., 360° C., 370° C., 380° C., 390° C., 400° C., 410° C., 420° C., 430° C., 440° C., 450° C., 460° C., 470° C., 480° C., and 490° C. In further aspects, the glass transition temperature can be in a range derived from any two of the above listed values. For example, in some aspects, the first polyimide has a glass transition temperature in the range of about 300° C. to 450° C. In other aspects, the first polyimide has a glass transition temperature in the range of about 300° C. to 400° C. In further aspects, the first polyimide has a glass transition temperature in the range of about 300° C. to 350° C. In still further aspects, the first polyimide has a glass transition temperature in the range of from about 300° C. to about 320° C.

According to other aspects of the disclosure, the second polyimide has a glass transition temperature of less than 300° C. as measured using differential scanning calorimetry (DSC) per ASTM test D3418, including exemplary glass transition temperatures of 180° C., 190° C., 200° C., 210° C., 220° C., 230° C., 240° C., 250° C., 260° C., 270° C., 280° C., and 290° C. In further aspects, the glass transition temperature can be in a range derived from any two of the above listed values. For example, in some aspects, the second polyimide has a glass transition temperature in the range of about 200° C. to less than 300° C. In other aspects, the second polyimide has a glass transition temperature in the range of about 200° C. to 290° C. In further aspects, the second polyimide has a glass transition temperature in the range of about 200° C. to 270° C. In still further aspects, the second polyimide has a glass transition temperature in the range of from about 200° C. to about 250° C.

In a further aspect, the first polyimide is present in an amount from greater than 0 wt % to about 70 wt %, relative to the total weight of the composition, including exemplary values of 5 wt %, 10 wt %, 15 wt %, 20 wt %, 25 wt %, 30 wt %, 35 wt %, 40 wt %, 45 wt %, 50 wt %, 55 wt %, 60 wt %, and 65 wt %. In further aspects, the weight percentage can be in a range derived from any two of the above listed exemplary wt % values. In a still further aspect, the first polyimide of the fiber reinforced thermoplastic resin composition is present in an amount ranging from greater than 0 wt % to about 50 wt %, relative to the total weight of the composition. In a yet further aspect, the first polyimide of the fiber reinforced thermoplastic resin composition is present in an amount ranging from greater than 0 wt % to about 35 wt %, relative to the total weight of the composition. In an even further aspect, the first polyimide of the fiber reinforced thermoplastic resin composition is present in an amount from greater than 0 wt % to about 28 wt %. In a still further aspect, the first polyimide of the fiber reinforced thermoplastic resin composition is present in an amount ranging from greater than 0 wt % to about 21 wt %, relative to the total weight of the composition. In yet further aspect, the first polyimide of the fiber reinforced thermoplastic resin composition is present in an amount from greater than 0 wt % to about 14 wt %. In an even further aspects, the first polyimide of the fiber reinforced thermoplastic resin composition is present in an amount ranging from greater than 0 wt % to about 7 wt %, relative to the total weight of the composition.

In a further aspect, the first polyimide is present in an amount from greater than 0 wt % to about 70 wt %, relative to the total weight of the composition, including exemplary values of 5 wt %, 10 wt %, 15 wt %, 20 wt %, 25 wt %, 30 wt %, 35 wt %, 40 wt %, 45 wt %, 50 wt %, 55 wt %, 60 wt %, and 65 wt %. In further aspects, the weight percentage can be in a range derived from any two of the above listed exemplary wt % values. In a still further aspect, the second polyimide of the fiber reinforced thermoplastic resin composition is present in an amount ranging from greater than 0 wt % to about 50 wt %, relative to the total weight of the composition. In a yet further aspect, the second polyimide of the fiber reinforced thermoplastic resin composition is present in an amount ranging from greater than 0 wt % to about 35 wt %, relative to the total weight of the composition. In an even further aspect, the second polyimide of the fiber reinforced thermoplastic resin composition is present in an amount from greater than 0 wt % to about 28 wt %. In a still further aspect, the second polyimide of the fiber reinforced thermoplastic resin composition is present in an amount ranging from greater than 0 wt % to about 21 wt %, relative to the total weight of the composition. In yet further aspect, the second polyimide of the fiber reinforced thermoplastic resin composition is present in an amount from greater than 0 wt % to about 14 wt %. In an even further aspects, the second polyimide of the fiber reinforced thermoplastic resin composition is present in an amount ranging from greater than 0 wt % to about 7 wt %, relative to the total weight of the composition.

In further aspects, the first polyimide and second polyimide can be in combination with each other and/or other of the disclosed polymeric materials in fabricating the polymeric components of the invention in any desired fraction or ratio. In various aspects, the weight ratio of the first polyimide:second polyimide can be from 95:1 to 1:95. In some aspects, the weight fraction of the first polyimide in the polyimide component can be from greater than 0 to less than about 1, including exemplary weight fractions of 0.1, 0.2, 0.3, 0.4, 0.5, 0.6, 0.7, 0.8, and 0.9. In other aspects, the weight fraction of the second polyimide in the polyimide component can be from greater than 0 to less than about 1, including exemplary weight fractions of 0.1, 0.2, 0.3, 0.4, 0.5, 0.6, 0.7, 0.8, and 0.9.

3. Reinforcement Fiber Component

In one aspect, the disclosed fiber reinforced thermoplastic resin composition of the present invention comprises at least one reinforcement fiber component. In further aspects, the reinforcement fiber component comprises a carbon fibers. In still further aspects, the carbon fibers can comprise polyacrylonitrile (PAN) based carbon fibers. In yet further aspects, the reinforcement fiber component comprises a glass fibers.

In some aspects, the reinforcement fiber component comprises carbon fibers having a tensile modulus in the range of from 28 to 48 MSI, including exemplary values of 29, 30, 31, 32, 33, 34, 35, 36, 37, 38, 39, 40, 41, 42, 43, 44, 45, 46, and 47 MSI. In further aspects, the tensile modulus can be in a range derived from any two of the above listed exemplary values, for example, the reinforcement fiber component can comprise carbon fibers having a tensile modulus in the range of from 32 to 45 MSI, or tensile modulus in the range of from 35 to 42 MSI.

In other aspects, the reinforcement fiber component comprises carbon fibers having a tensile strength in the range of from 400 to 1200 MSI, including exemplary values of 500, 600, 700, 800, 900, 1000, and 1100 MSI. In further aspects, the tensile strength can be in a range derived from any two of the above listed exemplary values, for example, the reinforcement fiber component can comprise carbon fibers having a tensile strength in the range of from 500 to 1000 MSI, or tensile strength in the range of from 700 to 900 MSI.

In some aspects, the reinforcement fiber component comprises glass fibers having a tensile modulus in the range of from 9 to 15 MSI, including exemplary values of 10, 11, 12, 13, and 14 MSI. In still further aspects, the tensile modulus can be in a range derived from any two of the above listed exemplary values, for example, the reinforcement fiber component can comprise glass fibers having a tensile modulus in the range of from 10 to 14 MSI, or 11 to 13 MSI.

In other aspects, the reinforcement fiber component comprises glass fibers having a tensile strength in the range of from 300 to 900 KSI, including exemplary values of 400, 500, 600, 700, and 800 MSI. In further aspects, the tensile strength can be in a range derived from any two of the above listed exemplary values, for example, the reinforcement fiber component comprises glass fibers having a tensile strength in the range of from 400 to 700 KSI, or in the range of from 450 to 650 KSI.

Non-limiting examples of commercially available carbon fibers include HexTow® IM7, commercially available from the Hexcel Corporation, and having a tensile modulus of about 40 MSI and TORAYCA® T800S, commercially available from Toray Carbon Fibers America, Inc., (a wholly owned subsidiary of Toray Industries, Inc.) and having a tensile modulus of about 42 MSI.

In a further aspect, the fiber reinforcement component is present in an amount from greater than 0 wt % to about 70 wt %, relative to the total weight of the composition, including exemplary values of 5 wt %, 10 wt %, 15 wt %, 20 wt %, 25 wt %, 30 wt %, 35 wt %, 40 wt %, 45 wt %, 50 wt %, 55 wt %, 60 wt %, and 65 wt %. In further aspects, the weight percentage can be in a range derived from any two of the above listed exemplary wt % values. In a still further aspect, the fiber reinforcement component of the fiber reinforced thermoplastic resin composition is present in an amount ranging from greater than 0 wt % to about 60 wt %, relative to the total weight of the composition. In a yet further aspect, the fiber reinforcement component of the fiber reinforced thermoplastic resin composition is present in an amount ranging from greater than 0 wt % to about 50 wt %, relative to the total weight of the composition. In an even further aspect, the fiber reinforcement component of the fiber reinforced thermoplastic resin composition is present in an amount from greater than 0 wt % to about 30 wt %.

In another aspect, the reinforcement fiber component is present in an amount ranging from 1 wt % to 40 wt % relative to the total weight of the composition, including exemplary values, 2 wt %, 4 wt %, 5 wt %, 10 wt %, 12 wt %, 15 wt %, 20 wt %, 25 wt %, 30 wt %, 33 wt %, 35 wt %, and 38 wt %. In still further aspects, the weight percentage can be in a range derived from any two of the above listed exemplary wt % values. For example, the reinforcement fiber component is present in an amount ranging from 15 to 30 wt % relative to the total weight of the composition.

4. Other Additives for Blended Thermoplastic Compositions

In various aspects, the fiber reinforced thermoplastic resin composition of the present invention further comprises an additive selected from coupling agents, antioxidants, mold release agents, UV absorbers, light stabilizers, heat stabilizers, lubricants, plasticizers, pigments, dyes, colorants, antistatic agents, nucleating agents, anti-drip agents, acid scavengers, and combinations of two or more of the foregoing. In a further aspect, the fiber reinforced thermoplastic resin composition of the present invention further comprises at least one polymer additive.

In addition to the foregoing components, the disclosed fiber reinforced thermoplastic resin composition can optionally comprise a balance amount of one or more additive materials ordinarily incorporated in thermoplastic resin compositions of this type, with the proviso that the additives are selected so as to not significantly adversely affect the desired properties of the fiber reinforced thermoplastic resin composition. Combinations of additives can be used. Such additives can be mixed at a suitable time during the mixing of the components for forming the composition. Exemplary and non-limiting examples of additive materials that can be present in the fiber reinforced thermoplastic resin compositions include an antioxidant, a stabilizer (including for example a heat stabilizer, a hydrolytic stabilizer, or a light stabilizer), UV absorbing additive, plasticizer, lubricant, mold release agent, antistatic agent, colorant (e.g., pigment and/or dye), or any combination thereof.

In a further aspect, the thermoplastic compositions can further comprise a primary antioxidant or "stabilizer" (e.g., a hindered phenol) and, optionally, a secondary antioxidant (e.g., a phosphate and/or thioester). Suitable antioxidant additives include, for example, alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 wt % to about 1 wt %, optionally about 0.05 wt % to about 0.5 wt % of the blend composition.

In a further aspect, suitable heat stabilizer additives include, for example, phosphonates such as dimethylbenzene phosphonate or the like, organic phosphates such as trimethyl phosphate, thioesters such as pentaerythritol beta-laurylthiopropionate, and the like, or combinations comprising at least one of the foregoing heat stabilizers. Heat stabilizers are generally used in amounts of about 0.01 wt % to about 5 wt %, for example about 0.05 wt % to about 0.3 wt %, of the fiber reinforced thermoplastic resin composition.

In a further aspect, light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and benzophenones such as 2-hydroxy-4-n-octoxy benzophenone, or the like, or combinations comprising at least one of the foregoing light stabilizers. Light stabilizers are generally used in amounts of about 0.01 wt % to about 10 wt %, optionally about 0.1 wt % to about 1 wt %, of the composition.

In a further aspect, suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3, 3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis (4H-3,1-benzoxazin-4-one) (CYASORB™ UV-3638); 1,3-bis[(2-cyano-3,3-diphenylacryloyl)oxy]-2,2-bis[[(2-cyano-3,3-diphenyl-acryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 wt % to about 5 wt %, of the fiber reinforced thermoplastic resin composition.

In various aspects, plasticizers, lubricants, and/or mold release agents additives can also be used. There is a considerable overlap among these types of materials, which include, for example, di- or polyfunctional aromatic phosphates such as resorcinol tetraphenyl diphosphate (RDP), the bis(diphenyl)phosphate of hydroquinone and the bis (diphenyl)phosphate of bisphenol-A; poly-alpha-olefins; epoxidized soybean oil; silicones, including silicone oils; esters, for example, fatty acid esters such as medium and high molecular weight alkyl stearyl esters; mixtures of fatty acid esters and hydrophilic and hydrophobic nonionic surfactants comprising polyethylene glycol polymers, polypropylene glycol polymers, and copolymers thereof; waxes such as beeswax, montan wax, paraffin wax or the like. Such materials are generally used in amounts of about 0.1 wt % to about 20 wt %, optionally about 1 wt % to about 10 wt %, of the fiber reinforced thermoplastic resin composition.

In a further aspect, colorants such as pigment and/or dye additives can also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 wt % to about 10 wt %, of the fiber reinforced thermoplastic resin composition.

In a further aspect, suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BB OT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3",5"-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or amounts of about 0.1 to about 10 ppm.

In a further aspect, the anti-drip agents can also be present. Exemplary anti-drip agents can include a fibril forming or non-fibril forming fluoropolymer such as polytetrafluoroethylene (PTFE). The anti-drip agent can optionally be encapsulated by a rigid copolymer, for example styrene-acrylonitrile (SAN). PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, about 50 wt % PTFE and about 50 wt % SAN, based on the total weight of the encapsulated fluoropolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer.

In various aspects, the fiber reinforced thermoplastic resin compositions of the present invention further comprise an additive selected from coupling agents, antioxidants, mold release agents, UV absorbers, light stabilizers, heat stabilizers, lubricants, plasticizers, pigments, dyes, colorants, antistatic agents, nucleating agents, anti-drip agents, acid scavengers, and combinations of two or more of the foregoing. In a further aspect, the fiber reinforced thermoplastic resin compositions of the present invention further comprise at least one polymer additive selected from a flame retardant, a colorant, a primary anti-oxidant, and a secondary anti-oxidant.

In a further aspect, the fiber reinforced thermoplastic resin compositions further comprise a flame retardant selected from a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphonate, phosphene, halogenated phosphorus compound, inorganic phosphorus containing salt, and a nitrogen-containing compound, or a combination comprising at least one of the foregoing. In a still further aspect, the flame retardant is a phosphorus-containing flame retardant. In a yet further aspect, the phosphorus-containing flame retardant is selected from resorcinol bis(biphenyl phosphate), bisphenol A bis(diphenyl phosphate), and hydroquinone bis(diphenyl phosphate), or mixtures thereof.

In a further aspect, the fiber reinforced thermoplastic resin compositions further comprise a primary anti-oxidant selected from a hindered phenol and secondary aryl amine, or a combination thereof. In a still further aspect, the hindered phenol comprises one or more compounds selected from triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamamide), tetrakis(methylene 3,5-di-tert-butyl-hydroxycinnamate)methane, and octadecyl 3,5-di-tert-butylhydroxyhydrocinnamate. In a yet further aspect, the hindered phenol comprises octadecyl-3-(3,5-di-t-butyl-4-hydroxyphenyl)-propionate. In an even further aspect, the hindered phenol is present in an amount from about 0.01 wt % to about 0.50 wt %. In a still further aspect, the hindered phenol is present in an amount from about 0.01 wt % to about 0.20 wt %.

In a further aspect, the fiber reinforced thermoplastic resin compositions further comprise a secondary anti-oxidant selected from an organophosphate and thioester, or a combination thereof. In a yet further aspect, the secondary anti-oxidant is present in an amount from about 0.01 wt % to about 0.50 wt %, based on the total composition. In a still further aspect, the secondary anti-oxidant is present in an amount from about 0.01 wt % to about 0.20 wt %, based on the total composition.

In a further aspect, the fiber reinforced thermoplastic resin compositions further comprise an anti-drip agent. In a still further aspect, the anti-drip agent is a styrene-acrylonitrile copolymer encapsulated PTFE (TSAN). In a yet further aspect, the anti-drip agent is present in an amount from about 0.1 wt % to about 5 wt %, based on the total composition. In an even further aspect, the anti-drip agent is present in an amount from about 0.1 wt % to about 1 wt %, based on the total composition.

5. Manufacture of Fiber Reinforced Thermoplastic Compositions

In various aspects, the fiber reinforced thermoplastic resin compositions of the present invention can be manufactured by various methods. The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

The temperature of the melt is minimized in order to avoid excessive degradation of the resins. For example, it can be desirable to maintain the melt temperature between about 230° C. and about 380° C. in the molten resin composition, although higher temperatures can be used provided that the residence time of the resin in the processing equipment is kept short. In a still further aspect, the extruder is typically operated at a temperature of about 180° C. to about 395° C. In a yet further aspect, the extruder is typically operated at a temperature of about 200° C. to about 370° C. In an even further aspect, the extruder is typically operated at a temperature of about 220° C. to about 350° C.

In various aspects, the fiber reinforced thermoplastic resin compositions of the present invention can be prepared by blending the polyaryletherketone (PAEK) component, the polyimide component, reinforcement fiber component, and optional filler components in mixer, e.g. a HENSCHEL-Mixer® high speed mixer or other suitable mixer/blender. Other low shear processes, including but not limited to hand mixing, can also accomplish this blending. The mixture can then be fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch desired polymeric resin and fed into the extruder. The extruder generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

In one aspect, the invention relates to a method for forming a thermoplastic blend comprising: a) combining: i) a polyaryletherketone (PAEK) component; ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and iii) a reinforcement fiber component.

In further aspects, the invention relates to a method for forming a thermoplastic blend comprising: a) combining: i) a polyaryletherketone (PAEK) component; ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and iii) a reinforcement fiber component; and b) extruding the thermoplastic blend. In further aspects, the step of combining comprises extrusion blending. In still further aspects, the method further comprises step of molding the thermoplastic polymer blend composition into a molded article.

In some aspects, the reinforcement fiber component comprises carbon fibers. In other aspects, the reinforcement fiber component comprises glass fibers.

In various aspects, the polyaryletherketone component comprises polyetheretherketone (PEEK), polyetherketone (PEK), polyetherketoneketone (PEKK), polyetherketoneetherketoneketone (PEKEKK), or polyetheretherketoneketone (PEEKK), or a combination thereof. In further aspects, the first polyimide comprises a polyetherimide sulfone. In still further aspects, the second polyimide comprises a polyetherimide sulfone.

In other aspects, the invention pertains to methods of forming fiber reinforced thermoplastic resin compositions, wherein a molded part formed from the thermoplastic composition exhibits a greater tensile strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In further aspects, the invention pertains to methods of forming fiber reinforced thermoplastic resin compositions, wherein a molded part formed from the thermoplastic composition exhibits a greater flexural strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In further aspects, the invention pertains to methods of forming fiber reinforced thermoplastic resin compositions, wherein a molded part formed from the thermoplastic composition exhibits an increased toughness compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In further aspects, the invention pertains to methods of forming fiber reinforced thermoplastic resin compositions, wherein a molded part formed from the thermoplastic composition exhibits a greater notched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In further aspects, the invention pertains to methods of forming fiber reinforced thermoplastic resin compositions, wherein a molded part formed from the thermoplastic composition exhibits a greater unnotched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In one aspect, the invention pertains to methods of improving impact strength of a fiber reinforced thermoplastic resin compositions comprising the step of combining: a) combining: i) a polyaryletherketone (PAEK) component; ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and iii) a reinforcement fiber component.

In one aspect, the invention pertains to methods of improving tensile strength of a fiber reinforced thermoplastic resin compositions comprising the step of combining: a) combining: i) a polyaryletherketone (PAEK) component; ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and iii) a reinforcement fiber component.

In one aspect, the invention pertains to methods of improving flexural strength of a fiber reinforced thermoplastic resin compositions comprising the step of combining: a) combining: i) a polyaryletherketone (PAEK) component; ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and iii) a reinforcement fiber component.

In one aspect, the invention pertains to methods of improving toughness of a fiber reinforced thermoplastic resin compositions comprising the step of combining: a) combining: i) a polyaryletherketone (PAEK) component; ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and iii) a reinforcement fiber component.

6. Fiber Reinforced Thermoplastic Resin Composition Properties

As noted above, the disclosed compositions exhibit good high temperature, as well as room temperature mechanical performance. In various aspects, the present invention can help overcome the low impact and strength issues of fiber reinforced thermoplastic compounds, including at room temperature.

In at least one aspect, the fiber reinforced thermoplastic resin composition exhibits improved tensile strength. For example, in further aspects, a molded part formed from a disclosed thermoplastic composition exhibits a greater tensile strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In at least one aspect, the fiber reinforced thermoplastic resin composition exhibits improved fluexural strength. For example, in further aspects, a molded part formed from a disclosed thermoplastic composition exhibits a greater flexural strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In at least one aspect, the fiber reinforced thermoplastic resin composition exhibits improved toughness. For example, in further aspects, a molded part formed from a disclosed thermoplastic composition exhibits an increased toughness compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In at least one aspect, the fiber reinforced thermoplastic resin composition exhibits improved notched Izod impact strength. For example, in further aspects, a molded part formed from a disclosed thermoplastic composition exhibits a greater notched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

In at least one aspect, the fiber reinforced thermoplastic resin composition exhibits improved unnotched Izod impact strength. For example, in further aspects, a molded part formed from a disclosed thermoplastic composition exhibits a greater unnotched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

C. Articles of Manufacture

In a further aspect, the fiber reinforced thermoplastic resin composition is capable of being used in the production of an article, wherein good high temperature, as well as room temperature mechanical performance are desirable. By overcoming the low impact and strength issues of prior art fiber reinforced thermoplastic compounds, including at room temperature, the fiber reinforced thermoplastic resin composition allows for the production of an article with mechanical properties suitable for use with high temperature valves, automotive engine components, automotive wheel components, and the like.

In various aspects, the disclosed fiber reinforced thermoplastic resin compositions of the present invention can be used in making articles. The disclosed fiber reinforced thermoplastic resin compositions can be formed into useful shaped articles by a variety of means such as; injection molding, extrusion, rotational molding, compression molding, blow molding, sheet or film extrusion, profile extrusion, gas assist molding, structural foam molding and thermoforming. The fiber reinforced thermoplastic resin compositions described herein can also be made into film and/or sheet as well as components of laminate systems. In a further aspect, in an aspect, a method of manufacturing an article comprises melt blending the thermoplastic polymer components, and reinforcement fiber component; and any additive component; and molding the extruded composition into an article. In a still further aspect, the extruding is done with a twin-screw extruder.

Shaped, formed, or molded articles including the composites are also provided. The composites can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like. In various further aspects, formed articles include, but are not limited to, electronic devices, medical devices, electrical connectors, enclosures for electrical equipment, protective carrying cases for electronic equipment, electric motor parts, power distribution equipment, communication equipment, computers, carrier tapes for housing an electronic component, and the like.

In a further aspect, the method comprises forming a molded part from the formed fiber reinforced thermoplastic resin composition.

D. Aspects

In various aspects, the present invention includes at least the following aspects.

Aspect 1: A fiber reinforced thermoplastic composition comprising: a) a thermoplastic polymer blend comprising: i) a polyaryletherketone (PAEK) component; and ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and b) a reinforcement fiber component.

Aspect 2: The fiber reinforced thermoplastic composition of aspect 1, comprising a) from 30 weight percent to less than 100 weight percent of the thermoplastic polymer blend comprising: i) a polyaryletherketone (PAEK) component; and ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and b) from greater than 0 to 70 weight percent of the reinforcement fiber component.

Aspect 3: The fiber reinforced thermoplastic composition of aspect 1 or 2, wherein the polyaryletherketone is present in an amount in the range of from 5 to 90 weight percent relative to the total weight of the composition.

Aspect 4: The fiber reinforced thermoplastic composition of any preceding aspect, wherein the polyaryletherketone component is present in an amount in the range of from 20 to 80 weight percent relative to the total weight of the composition.

Aspect 5: The fiber reinforced thermoplastic composition of any preceding aspect, wherein the polyaryletherketone component is present in an amount in the range of from 30 to 60 weight percent relative to the total weight of the composition.

Aspect 6: The fiber reinforced thermoplastic composition of any preceding aspect, wherein the polyaryletherketone component comprises polyetheretherketone (PEEK), polyetherketone (PEK), polyetherketoneketone (PEKK), polyetherketoneetherketoneketone (PEKEKK), or polyetheretherketoneketone (PEEKK), or a combination thereof.

Aspect 7: The fiber reinforced thermoplastic composition of any preceding aspect wherein the polyimide component is present in an amount in the range of from 5 to 90 weight percent relative to the total weight of the composition.

Aspect 8: The fiber reinforced thermoplastic composition of any preceding aspect, wherein the polyimide component is present in an amount in the range of from 20 to 80 weight percent relative to the total weight of the composition.

Aspect 9: The fiber reinforced thermoplastic composition of any preceding aspect, wherein the polyimide component is present in an amount in the range of from 30 to 60 weight percent relative to the total weight of the composition.

Aspect 10: The fiber reinforced thermoplastic composition of any preceding aspect, wherein the second polyimide is present in the polyimide component in a weight fraction in the range of from 0.05 to 0.95 relative to the total weight of the polyimide component.

Aspect 11: The fiber reinforced thermoplastic composition of any preceding aspect, wherein the second polyimide is present in the polyimide component in a weight fraction in the range of from 0.2 to 0.9 relative to the total weight of the polyimide component.

Aspect 12: The fiber reinforced thermoplastic composition of any preceding aspect, wherein the second polyimide is present in the polyimide component in a weight fraction in the range of from 0.4 to 0.8 relative to the total weight of the polyimide component.

Aspect 13: The fiber reinforced thermoplastic composition of any preceding aspect, wherein the first polyimide has a glass transition temperature in the range of from 300° C. to 320° C.

Aspect 14: The fiber reinforced thermoplastic composition of any preceding aspect, wherein the second polyimide has a glass transition temperature less than 300° C.

Aspect 15: The fiber reinforced thermoplastic composition of any preceding aspect, wherein the second polyimide has a glass transition temperature less than 280° C.

Aspect 16: The fiber reinforced thermoplastic composition of any preceding aspect, wherein the second polyimide has a glass transition temperature less than 270° C.

Aspect 17: The fiber reinforced thermoplastic composition of any preceding aspect, wherein the second polyimide has a glass transition temperature less than 260° C.

Aspect 18: The fiber reinforced thermoplastic composition of any preceding aspect, wherein the polyaryletherketone component has a melt viscosity in the range of from 50 to 800 Pascal-seconds measured at 400° C. and under a shear rate of 1000/s.

Aspect 19: The fiber reinforced thermoplastic composition of any preceding aspect, wherein the polyaryletherketone component has a melt viscosity in the range of from 70 to 500 Pascal-seconds measured at 400° C. and under a shear rate of 1000/s.

Aspect 20: The fiber reinforced thermoplastic composition of any preceding aspect, wherein the polyaryletherketone component has a melt viscosity in the range of from 90 to 300 Pascal-seconds measured at 400° C. and under a shear rate of 1000/s.

Aspect 21: The fiber reinforced thermoplastic composition of any preceding aspect, wherein the reinforcement fiber component is present in the composition in an amount in the range of from 5 to 50 weight percent relative to the total weight of the composition.

Aspect 22: The fiber reinforced thermoplastic composition of any preceding aspect, wherein the reinforcement fiber component is present in the composition in an amount in the range of from 10 to 40 weight percent relative to the total weight of the composition.

Aspect 23: The fiber reinforced thermoplastic composition of any preceding aspect, wherein the reinforcement fiber component comprises carbon fibers.

Aspect 24: The fiber reinforced thermoplastic composition of any preceding aspect, wherein the reinforcement fiber component comprises carbon fibers having a tensile modulus in the range of from 28 to 48 MSI.

Aspect 25: The fiber reinforced thermoplastic composition of any preceding aspect, wherein the reinforcement fiber component comprises carbon fibers having a tensile modulus in the range of from 32 to 45 MSI.

Aspect 26: The fiber reinforced thermoplastic composition of any preceding aspect, wherein the reinforcement fiber component comprises carbon fibers having a tensile modulus in the range of from 35 to 42 MSI.

Aspect 27: The fiber reinforced thermoplastic composition of any preceding aspect, wherein the reinforcement fiber component comprises carbon fibers having a tensile strength in the range of from 400 to 1200 KSI.

Aspect 28: The fiber reinforced thermoplastic composition of any preceding aspect, wherein the reinforcement fiber component comprises carbon fibers having a tensile strength in the range of from 500 to 1000 KSI.

Aspect 29: The fiber reinforced thermoplastic composition of any preceding aspect, wherein the reinforcement fiber component comprises carbon fibers having a tensile strength in the range of from 700 to 900 KSI.

Aspect 30: The fiber reinforced thermoplastic composition of any preceding aspect, wherein the reinforcement fiber component comprises glass fibers.

Aspect 31: The fiber reinforced thermoplastic composition of any preceding aspect, wherein the reinforcement fiber component comprises glass fibers having a tensile modulus in the range of from 9 to 15 MSI.

Aspect 32: The fiber reinforced thermoplastic composition of any preceding aspect, wherein the reinforcement fiber component comprises glass fibers having a tensile modulus in the range of from 10 to 14 MSI.

Aspect 33: The fiber reinforced thermoplastic composition of any preceding aspect, wherein the reinforcement fiber component comprises glass fibers having a tensile modulus in the range of from 11 to 13 MSI.

Aspect 34: The fiber reinforced thermoplastic composition of any preceding aspect, wherein the reinforcement fiber component comprises glass fibers having a tensile strength in the range of from 300 to 900 KSI.

Aspect 35: The fiber reinforced thermoplastic composition of any preceding aspect, wherein the reinforcement fiber component comprises glass fibers having a tensile strength in the range of from 400 to 700 KSI.

Aspect 36: The fiber reinforced thermoplastic composition of any preceding aspect, wherein the reinforcement fiber component comprises glass fibers having a tensile strength in the range of from 450 to 650 KSI.

Aspect 37: The fiber reinforced thermoplastic composition according to any preceding aspect, wherein the first polyimide comprises a polyetherimide sulfone.

Aspect 38: The fiber reinforced thermoplastic composition according to any preceding aspect, wherein the second polyimide comprises a polyetherimide sulfone.

Aspect 39: The fiber reinforced thermoplastic composition according to any preceding aspect, wherein the first polyimide is a polycondensation reaction product of 4,4'-oxydiphthalic dianhydride (ODPA) and 4,4'-diaminodiphenyl sulfone (DDS).

Aspect 40: The fiber reinforced thermoplastic composition according to any preceding aspect, wherein the second polyimide is a polycondensation reaction product of 4,4'-Bisphenol A dianhydride (BPADA) and 4,4'-diaminodiphenyl sulfone (DDS).

Aspect 41: The fiber reinforced thermoplastic composition according to any preceding aspect, wherein a molded part formed from the thermoplastic composition exhibits a greater tensile strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 42: The fiber reinforced thermoplastic composition according to any preceding aspect, wherein a molded part formed from the thermoplastic composition exhibits a greater flexural strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 43: The fiber reinforced thermoplastic composition according to any preceding aspect, wherein a molded part formed from the thermoplastic composition exhibits an increased toughness compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 44: The fiber reinforced thermoplastic composition according to any preceding aspect, wherein a molded part formed from the thermoplastic composition exhibits a greater notched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 45: The fiber reinforced thermoplastic composition according to any preceding aspect, wherein a molded part formed from the thermoplastic composition exhibits a greater unnotched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 46: A fiber reinforced thermoplastic composition of aspect 1, comprising: a) from 60 to 90 weight percent of a thermoplastic polymer blend comprising: i) a polyetheretherketone (PEEK) component; and ii) a polyimide component comprising a blend of at least a first polyimide (PI) having glass transition temperature of at least 300° C. and a second polyimide (PI) having glass transition temperature in the range of from 240° C. to 260° C., wherein the second polyimide is present in the polyimide component in a relative weight fraction in the range of from 0.2 to 0.8 relative to the total weight of the polyimide component; and b) from greater than 10 to 40 weight percent of a reinforcement fiber component.

Aspect 47: The fiber reinforced thermoplastic composition of aspect 46, wherein the reinforcement fiber component comprises carbon fibers having a tensile modulus in the range of from 28 to 48 MSI.

Aspect 48: The fiber reinforced thermoplastic composition of aspect 46 or 47, wherein the polyetheretherketone component is present in an amount in the range of from 30 to 60 weight percent relative to the total weight of the composition.

Aspect 49: The fiber reinforced thermoplastic composition of aspect 46, 47, or 48, wherein the polyimide component is present in an amount in the range of from 30 to 60 weight percent relative to the total weight of the composition.

Aspect 50: The fiber reinforced thermoplastic composition according to any of aspects 46 to 49, wherein a molded part formed from the thermoplastic composition exhibits a greater tensile strength compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

Aspect 51: The fiber reinforced thermoplastic composition according to any of aspects 46 to 50, wherein a molded part formed from the thermoplastic composition exhibits a greater flexural strength compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

Aspect 52: The fiber reinforced thermoplastic composition according to any of aspects 46 to 51, wherein a molded part formed from the thermoplastic composition exhibits an increased toughness compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

Aspect 53: The fiber reinforced thermoplastic composition according to any of aspects 46 to 52, wherein a molded part formed from the thermoplastic composition exhibits a greater notched Izod impact strength compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

Aspect 54: The fiber reinforced thermoplastic composition according to any of aspects 46 to 53, wherein a molded part formed from the thermoplastic composition exhibits a greater unnotched Izod impact strength compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

Aspect 55: An article of manufacture comprising the fiber reinforced thermoplastic composition according to any of the preceding aspects.

Aspect 56: A method for forming a thermoplastic blend comprising: a) combining: i) a polyaryletherketone (PAEK) component; ii) a polyimide component, wherein the polyimide component comprises a blend of at least a first polyimide (PI) having glass transition temperature of at least 300° C. and a second polyimide (PI) having glass transition temperature less than the glass transition temperature of the first polyimide; and iii) a reinforcement fiber component.

Aspect 57: The method according to any preceding aspect, wherein the step of combining comprises extrusion blending.

Aspect 58: The method according to any preceding aspect, further comprising step of molding the thermoplastic polymer blend composition into a molded article.

Aspect 59: The method of any preceding aspect, wherein the reinforcement fiber component comprises carbon fibers.

Aspect 60: The method of any preceding aspect, wherein the reinforcement fiber component comprises glass fibers.

Aspect 61: The method of any preceding aspect, wherein the polyaryletherketone component comprises polyetheretherketone (PEEK), polyetherketone (PEK), polyetherketoneketone (PEKK), polyetherketoneetherketoneketone (PEKEKK), or polyetheretherketoneketone (PEEKK), or a combination thereof.

Aspect 62: The method according to any preceding aspect, wherein the first polyimide comprises a polyetherimide sulfone.

Aspect 63: The method according to any preceding aspect, wherein the second polyimide comprises a polyetherimide sulfone.

Aspect 64: The method according to any preceding aspect, wherein a molded part formed from the thermoplastic composition exhibits a greater tensile strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 65: The method according to any preceding aspect, wherein a molded part formed from the thermoplastic composition exhibits a greater flexural strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 66: The method according to any preceding aspect, wherein a molded part formed from the thermoplastic composition exhibits an increased toughness compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 67: The method according to any preceding aspect, wherein a molded part formed from the thermoplastic composition exhibits a greater notched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Aspect 68: The fiber method according to any preceding aspect, wherein a molded part formed from the thermoplastic composition exhibits a greater unnotched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way Appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

E. Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only routine experimentation, if any, will be required to optimize such process conditions. The materials shown in Table 1 were used to prepare the compositions described and evaluated herein.

TABLE 1

| Item | Description | Supplier |
| --- | --- | --- |
| PEEK | Polyetheretherketone (PEEK) resin having a melt viscosity of 150 (Pa-s) when determined at 400° C. and a shear rate of 1000/s | Victrex, Inc. |
| P1 | Polyetherimidesulfone resin obtained as the condensation reaction product of 4,4'-oxydiphthalic dianyhyride (ODPA), and 4,4'-diaminodiphenyl sulfone (DDS) having a Tg between 300-310° C. | SABIC I.P. |
| P2 | Polyetherimidesulfone resin obtained as the condensation-reaction product of 4,4'-Bisphenol A dianhydride (SPADA) and 4,4'-diaminodiphenyl sulfone (DDS) having a Tg of ~247° C. Commercially available as VH1003. | SABIC I.P. |
| CF | Intermediate modulus carbon fiber having a tensile modulus of 40 MSI and tensile strength of 822 KSI | Hexcel Inc. |

In each of the examples, sample batches (10 kg) were prepared by compounding the materials in a ZSK 40 mm twin screw extruder where the PEEK, P1 and/or P2 resins were added at the feed throat and the carbon fibers were fed downstream. The barrel temperatures ranged from 370° C. to 395° C. The screw speed was 125 rpm and the feed rate was 75 lbs/hr. To make test specimens, the dried pellets were injection molded to form appropriate test samples with barrel temperatures of 395 to 410° C. and mold temperature set to 175 to 190° C.

Notched Izod impact strength ('NII') was measured using an impact tester from Tinius Olsen and was carried out in accordance with ASTM D 256. This test fixes one end of a notched specimen in a cantilever position by means of a vice. A striker on the arm of a pendulum or similar energy carrier then strikes the specimen. The energy absorbed by the specimen in the breaking process can be converted into an indication of a materials notched impact resistance using such units as foot-pounds or joules.

Tensile strength was determined using a Material Testing System (MTS) from Instron with a test speed of 5 mm/min and carried out in accordance with ASTM D 638. Dog-bone shaped ASTM tensile bar specimens were clamped between the two grips of the Instron MTS and a continually increasing uniaxial load was applied on the test specimens and tensile properties were measured from the stress-strain curves generated during the testing.

Flexural strength was determined by three-point bending test on ASTM flexural bar specimens with a test span of 50 mm and was carried out in accordance with ASTM D 790. Testing was performed on an Instron Material Testing System (MTS) with a 1.3 mm/min cross-head speed.

Toughness was derived using data from the area under the tensile stress-strain.

Table 2 shows the compositions of different thermoplastic blend compositions described herein, including control compositions, labeled "COMP.", and exemplary compositions of the present invention, labeled "EX.". For COMP.1, the zero weight fraction of P2 in the polyimide component represents the composites consisted of 30 wt % carbon fiber, 35 wt % PEEK and 35 wt % P1.

TABLE 2

| No. | Item | COMP. 1 | EX. 2 | EX. 3 | EX. 4 | EX. 5 | COMP. 6 |
|---|---|---|---|---|---|---|---|
| 1 | PEEK | 35 | 35 | 35 | 35 | 35 | 35 |
| 2 | P1 | 35 | 28 | 21 | 14 | 7 | 0 |
| 3 | P2 | 0 | 7 | 14 | 21 | 28 | 35 |
| 4 | CF | 30 | 30 | 30 | 30 | 30 | 30 |
| | Formulation Total | 100 | 100 | 100 | 100 | 100 | 100 |
| | P2 Wt fraction in polyimide component | 0 | 0.2 | 0.4 | 0.6 | 0.8 | 1.0 |

Figure 2:
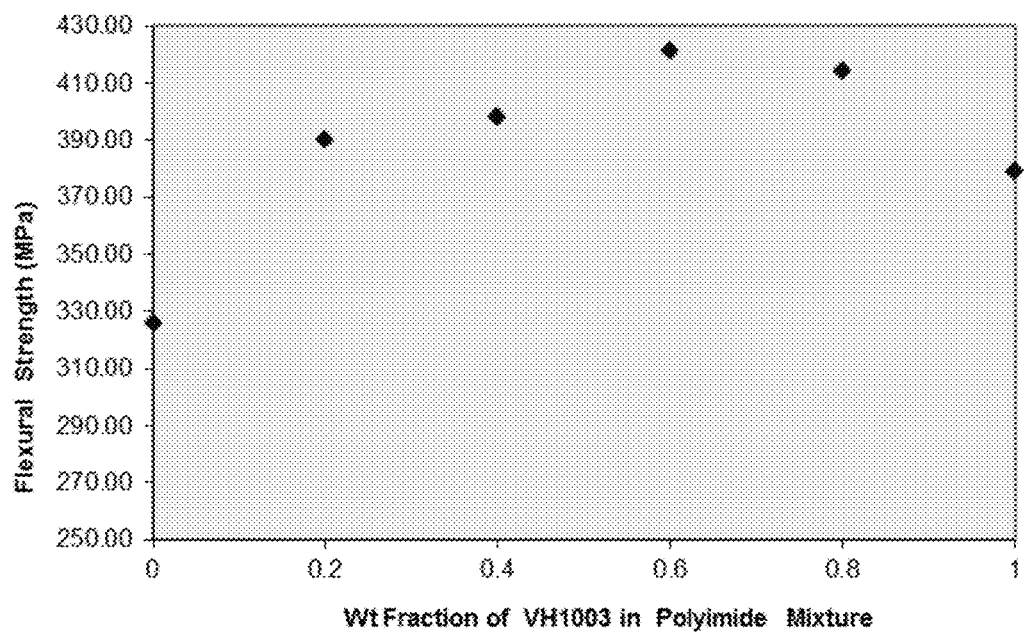
FIG. 2 is a graph showing the flexural strength performance of composites at different weight fraction of the second polyimide P2 in accordance with the present invention.

FIG. 1 shows the tensile strength of 30 wt % carbon fiber (CF) reinforced PEEK and polyimide blends having different weight fraction of polyimide P2. FIG. 2 shows the flexural strength for the same composites. As the data in FIGS. 1 and 2 suggests, both tensile and flexural strength of the inventive composite systems increases gradually as the weight fraction of P2 increases. Surprisingly, the inventive composites having all four constituents (CF, PEEK, P1 and P2) exhibit tensile and flexural strengths that are higher than the tensile and flexural strength of the control composites that have only P1 or P2 as the polyimide component.

Figure 3:
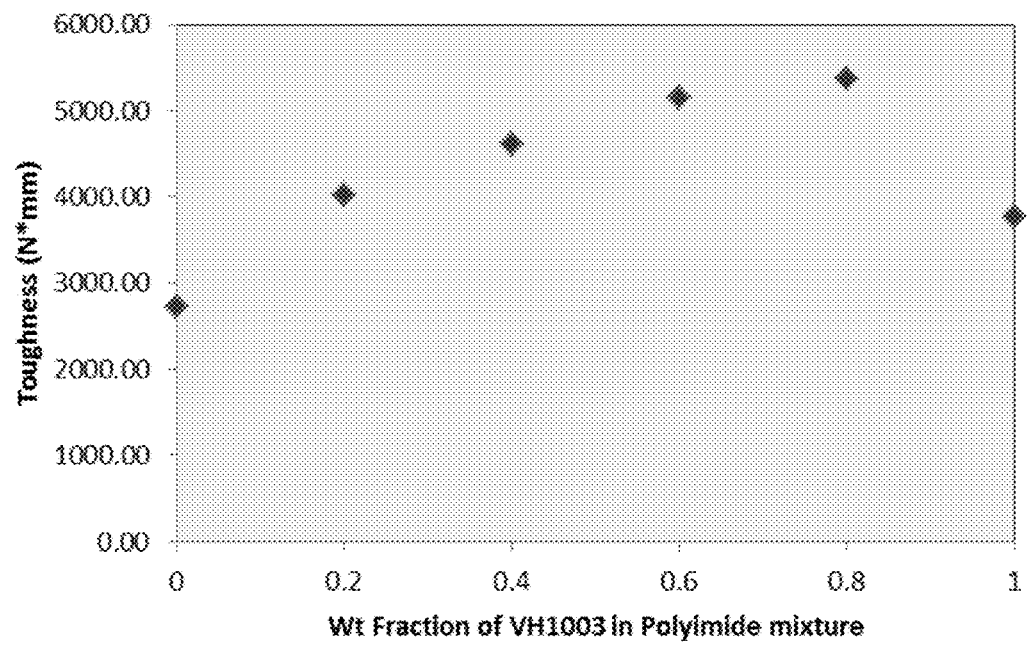
FIG. 3 is a graph showing toughness performance of composites at different weight fraction of the second polyimide P2 in accordance with the present invention.

FIG. 3 shows the toughness of the composites at different weight fraction of polyimide P2. The toughness data was derived from the area under the tensile stress-strain curves. Similar to the tensile and flexural strength, the toughness of the inventive composite systems increases gradually as the weight fraction of P2 increases. Again, the inventive composites having all four constituents (CF, PEEK, P1 and P2) exhibit higher toughness than the toughness of the two control composites that have only P1 or P2 as the polyimide component.

Figure 4:
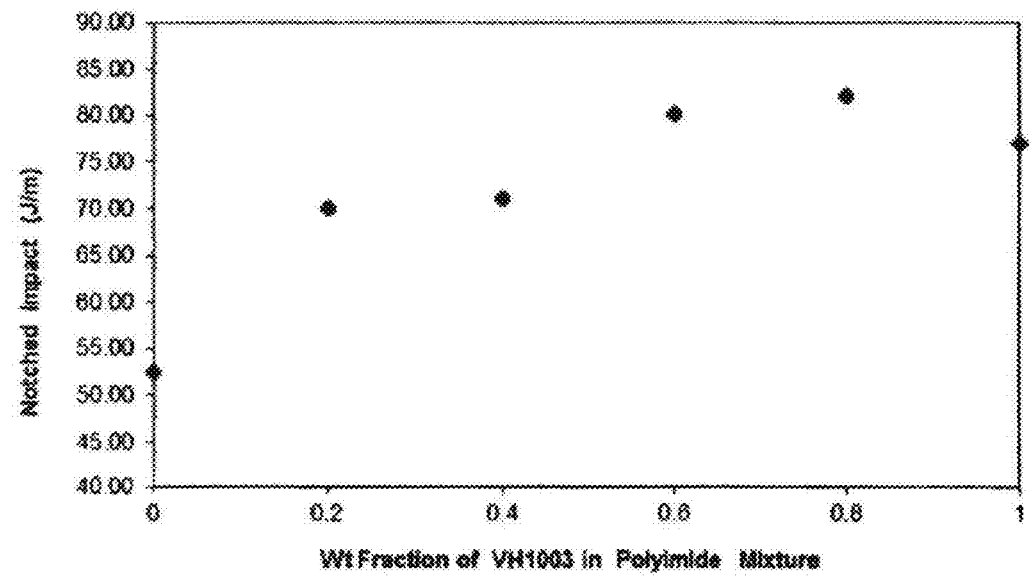
FIG. 4 is a graph showing the nothched Izod Impact performance of composites at different weight fraction of the second polyimide P2 in accordance with the present invention.
Figure 5:
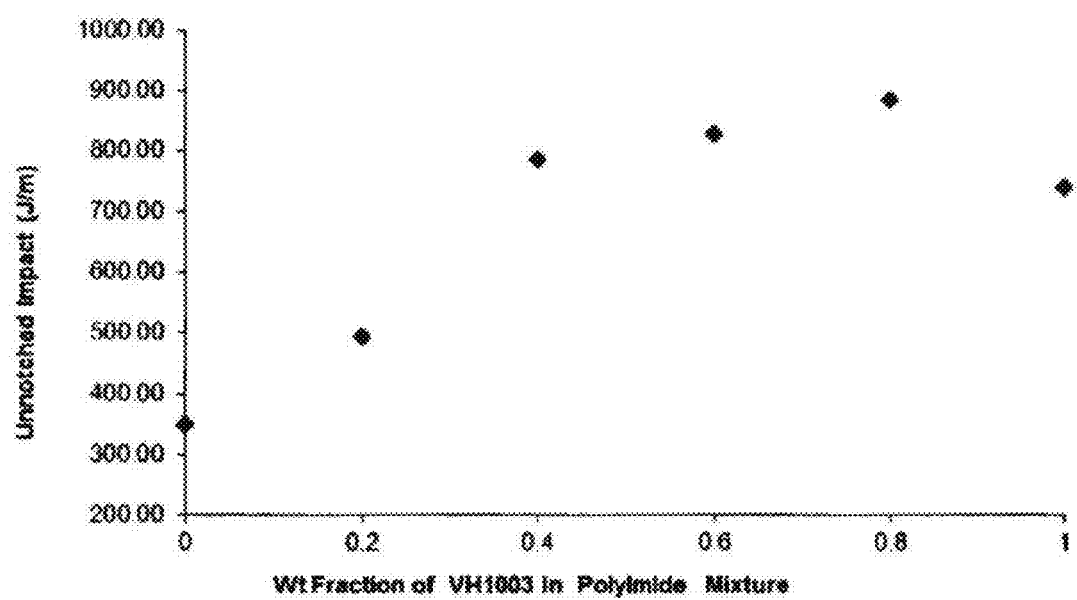
FIG. 5 is a graph showing the unnotched Izod impact performance of composites at different weight fraction of the second polyimide P2 in accordance with the present invention.

FIG. 4 shows the notched Izod impact strength of the composites at different weight fraction of polyimide P2. FIG. 5 shows the unnotched Izod impact strength of the composites at different weight fraction of polyimide P2. As the data in FIGS. 4 and 5 shows, both the notched and unnotched Izod impact strength of the composite system increases gradually as the weight fraction of P2 increases. Moreover, both inventive composites EX. 4 and EX. 5 exhibit higher impact strength than the impact strength of the two control composites that have only P1 or P2 as the polyimide component.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fiber reinforced thermoplastic composition comprising
   a. a thermoplastic polymer blend comprising
      i. a polyaryletherketone (PAEK) component; and
      ii. a polyimide component, wherein the polyimide component comprises a blend of at least a first polyimide having glass transition temperature of at least 300° C. and a second polyimide having glass transition temperature less than the glass transition temperature of the first polyimide; wherein neither the first polyimide nor the second polyimide contains fluorine or silicon atoms; and
   b. a reinforcement fiber component,
   wherein the polyaryletherketone component is present in an amount in the range of from 30 to 60 weight percent relative to the total weight of the composition.

2. The fiber reinforced thermoplastic composition of claim 1, wherein the polyaryletherketone component comprises polyetheretherketone, polyetherketone, polyetherketoneketone, polyetherketoneetherketoneketone, or polyetheretherketoneketone, or a combination thereof.

3. The fiber reinforced thermoplastic composition of claim 1, wherein the polyimide component is present in an amount in the range of from 30 to 60 weight percent relative to the total weight of the composition.

4. The fiber reinforced thermoplastic composition of claim 1, wherein the second polyimide is present in the polyimide component in a weight fraction in the range of from 0.05 to 0.95 relative to the total weight of the polyimide component.

5. The fiber reinforced thermoplastic composition of claim 1, wherein the second polyimide is present in the polyimide component in a weight fraction in the range of from 0.2 to 0.9 relative to the total weight of the polyimide component.

TABLE 3

| | Test Detail | Units | COMP. 1 | EX.2 | EX.3 | EX.4 | EX. 5 | COMP. 6 |
|---|---|---|---|---|---|---|---|---|
| 1 TS | Tensile Strength, 23° C. | MPa | 252 | 283 | 288 | 302 | 302 | 271 |
| 2 NII | Notched Impact, 23° C. | J/m | 53 | 70 | 71 | 80 | 82 | 77 |
| 3 UII | Unnotched Impact, 23° C. | J/m | 350 | 491 | 783 | 825 | 883 | 738 |
| 4 FS | Flexural Strength, 23° C. | MPa | 326 | 383 | 393 | 421 | 414 | 379 |
| 5 T | Toughness, 23° C. | N * mm | 2727 | 4022 | 4612 | 5155 | 5373 | 3776 |

6. The fiber reinforced thermoplastic composition of claim 1, wherein the second polyimide is present in the polyimide component in a weight fraction in the range of from 0.4 to 0.8 relative to the total weight of the polyimide component.

7. The fiber reinforced thermoplastic composition of any preceding claim, wherein the first polyimide has a glass transition temperature in the range of from 300° C. to 320° C.

8. The fiber reinforced thermoplastic composition of claim 1, wherein the second polyimide has a glass transition temperature less than 300° C.

9. The fiber reinforced thermoplastic composition of claim 1, wherein the second polyimide has a glass transition temperature less than 280° C.

10. The fiber reinforced thermoplastic composition of claim 1, wherein the second polyimide has a glass transition temperature less than 260° C.

11. The fiber reinforced thermoplastic composition of claim 1, wherein the polyaryletherketone component has a melt viscosity in the range of from 50 to 800 Pascal-seconds measured at 400° C. and under a shear rate of 1000/s.

12. The fiber reinforced thermoplastic composition of claim 1, wherein the polyaryletherketone component has a melt viscosity in the range of from 70 to 500 Pascal-seconds measured at 400° C. and under a shear rate of 1000/s.

13. The fiber reinforced thermoplastic composition of claim 1, wherein the reinforcement fiber component is present in the composition in an amount in the range of from 5 to 50 weight percent relative to the total weight of the composition.

14. The fiber reinforced thermoplastic composition of claim 1, wherein the reinforcement fiber component is present in the composition in an amount in the range of from 10 to 40 weight percent relative to the total weight of the composition.

15. The fiber reinforced thermoplastic composition of claim 1, wherein the reinforcement fiber component comprises carbon fibers.

16. The fiber reinforced thermoplastic composition claim 1, wherein the reinforcement fiber component comprises carbon fibers having a tensile modulus in the range of from 28 to 48 MSI.

17. The fiber reinforced thermoplastic composition of claim 1, wherein the reinforcement fiber component comprises carbon fibers having a tensile strength in the range of from 400 to 1200 KSI.

18. The fiber reinforced thermoplastic composition of claim 1, wherein the reinforcement fiber component comprises glass fibers.

19. The fiber reinforced thermoplastic composition of claim 1, wherein the reinforcement fiber component comprises glass fibers having a tensile modulus in the range of from 9 to 15 MSI.

20. The fiber reinforced thermoplastic composition of claim 1, wherein the reinforcement fiber component comprises glass fibers having a tensile strength in the range of from 300 to 900 KSI.

21. The fiber reinforced thermoplastic composition of claim 1, wherein the first polyimide or the second polyimide comprises a polyetherimide sulfone.

22. The fiber reinforced thermoplastic composition of claim 21, wherein the first polyimide is a polycondensation reaction product of 4,4'-oxydiphthalic dianhydride and 4,4'-diaminodiphenyl sulfone.

23. The fiber reinforced thermoplastic composition of claim 21, wherein the second polyimide is a polycondensation reaction product of 4,4'-Bisphenol A dianhydride and 4,4'-diaminodiphenyl sulfone.

24. The fiber reinforced thermoplastic composition of claim 1, wherein a molded part formed from the thermoplastic composition exhibits a greater tensile strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

25. The fiber reinforced thermoplastic composition of claim 1, wherein a molded part formed from the thermoplastic composition exhibits a greater flexural strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

26. The fiber reinforced thermoplastic composition of claim 1, wherein a molded part formed from the thermoplastic composition exhibits an increased toughness compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

27. The fiber reinforced thermoplastic composition of claim 1, wherein a molded part formed from the thermoplastic composition exhibits a greater notched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

28. The fiber reinforced thermoplastic composition of claim 1, wherein a molded part formed from the thermoplastic composition exhibits a greater unnotched Izod impact strength compared to a molded part formed from a substantially identical reference composition comprising the same weight percentage of the polyaryletherketone component, the same weight percentage of the reinforcement fiber component, and the same weight percentage of the polyimide component but in the absence of the second polyimide.

29. A fiber reinforced thermoplastic composition comprising
 a. from 60 to 90 weight percent of a thermoplastic polymer blend comprising:
  i. a polyetheretherketone (PEEK) component; and
  ii. a polyimide component comprising a blend of at least a first polyimide having glass transition temperature of at least 300° C. and a second polyimide having glass transition temperature in the range of from 240° C. to 260° C., wherein the second polyimide is present in the polyimide component in a relative weight fraction in the range of from 0.2 to 0.8 relative to the total weight of the polyimide component; wherein neither the first polyimide nor the second polyimide contains fluorine or silicon atoms; and
 b. from greater than 10 to 40 weight percent of a reinforcement fiber component,
 wherein the polyetheretherketone component is present in an amount in the range of from 30 to 60 weight percent relative to the total weight of the composition.

30. The fiber reinforced thermoplastic composition of claim 29, wherein the reinforcement fiber component comprises carbon fibers having a tensile modulus in the range of from 28 to 48 MSI.

31. The fiber reinforced thermoplastic composition of claim 29, wherein the polyimide component is present in an amount in the range of from 30 to 60 weight percent relative to the total weight of the composition.

32. The fiber reinforced thermoplastic composition of claim 29, wherein a molded part formed from the thermoplastic composition exhibits a greater tensile strength compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

33. The fiber reinforced thermoplastic composition of claim 29, wherein a molded part formed from the thermoplastic composition exhibits a greater flexural strength compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

34. The fiber reinforced thermoplastic composition of claim 29, wherein a molded part formed from the thermoplastic composition exhibits an increased toughness compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

35. The fiber reinforced thermoplastic composition of claim 29, wherein a molded part formed from the thermoplastic composition exhibits a greater notched Izod impact strength compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

36. The fiber reinforced thermoplastic composition of claim 29, wherein a molded part formed from the thermoplastic composition exhibits a greater unnotched Izod impact strength compared to a molded part formed from a substantially identical reference composition comprising the same weight percentage of the polyetheretherketone component, the same weight percentage of the reinforcement fiber component, and the same weight percentage of the polyimide component but in the absence of the second polyimide.

37. An article of manufacture comprising the fiber reinforced thermoplastic composition of claim 1.

* * * * *